(12) United States Patent
Saegusa et al.

(10) Patent No.: US 9,835,938 B2
(45) Date of Patent: Dec. 5, 2017

(54) LENS ADJUSTMENT MECHANISM AND PROJECTOR

(71) Applicant: SEIKO EPSON CORPORATION, Tokyo (JP)

(72) Inventors: Takashi Saegusa, Matsumoto (JP); Masato Kadotani, Matsumoto (JP); Toshizo Nishi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/415,042

(22) Filed: Jan. 25, 2017

(65) Prior Publication Data

US 2017/0227838 A1 Aug. 10, 2017

(30) Foreign Application Priority Data

Feb. 4, 2016 (JP) .................. 2016-020193

(51) Int. Cl.
*G03B 21/20* (2006.01)
*G03B 21/14* (2006.01)

(52) U.S. Cl.
CPC ......... G03B 21/208 (2013.01); G03B 21/145 (2013.01)

(58) Field of Classification Search
CPC ...... G03B 21/00; G03B 21/14; G03B 21/142; G03B 21/145; H04N 9/28; H04N 9/317; H04N 9/3185; G02F 1/13; G02F 1/1333
See application file for complete search history.

(56) References Cited

U.S. PATENT DOCUMENTS 5,418,586 A * 5/1995 Fujimori .............. H04N 9/3105
                                                   348/E9.027
2009/0185145 A1* 7/2009 Kitahara .............. G03B 21/005
                                                   353/101

FOREIGN PATENT DOCUMENTS

JP    2005-043653 A    2/2005
JP    2008-070692 A    3/2008
JP    2008-070693 A    3/2008

* cited by examiner

*Primary Examiner* — Sultan Chowdhury
(74) *Attorney, Agent, or Firm* — Oliff PLC

(57) ABSTRACT

A projector includes an adjustment mechanism adjusting a light axis of the optical member. The adjustment mechanism includes a first member, a second member attached to be movable in a first direction orthogonal to the light axis of the optical member with respect to the first member, a third member holding the optical member and attached to be rotatable around a rotation center axis parallel to the light axis with respect to the second member, a first adjustment portion moving the second member in the first direction with respect to the first member, and a second adjustment portion rotating the third member around the rotation center axis with respect to the second member, and an operation portion of the first adjustment portion and an operation portion of the second adjustment portion are placed at the same side.

10 Claims, 12 Drawing Sheets

LENS ADJUSTMENT MECHANISM AND PROJECTOR

BACKGROUND

1. Technical Field

The present invention relates to a projector.

2. Related Art

An adjustment mechanism capable of moving a condenser lens in the longitudinal direction and the lateral direction of a screen is described in, for example, JP-A-2005-43653.

However, in the adjustment mechanism as described above, when a condenser lens (optical member) is moved in the longitudinal direction of the screen and when the condenser lens is moved in the lateral direction of the screen, directions for using an adjustment tool may be different and time and efforts are needed for adjusting a position of a light axis of the condenser lens, which is problematic.

In contrast, for example, when a configuration in which an adjustment portion for moving the condenser lens in the longitudinal direction of the screen and another adjustment portion for moving the condenser lens in the lateral direction of the screen are placed at the same side is adopted, the adjustment tools may be used in the same direction and time and efforts for adjustment may be reduced. However, in this case, there is a problem that the adjustment mechanism may easily become complicated.

SUMMARY

An advantage of some aspects of the invention is to provide a projector and has a structure capable of reducing time and efforts for adjusting a position of a light axis of an optical member while preventing an adjustment mechanism from being complicated.

A projector according to an aspect of the invention includes a light source emitting light, an optical member onto which light emitted from the light source is incident, a light modulation device modulating light passing through the optical member, a projection optical device projecting light modulated by the light modulation device, and an adjustment mechanism adjusting a light axis of the optical member, in which the adjustment mechanism includes a first member, a second member attached to be movable in a first direction orthogonal to the light axis of the optical member with respect to the first member, a third member holding the optical member and attached to be rotatable around a rotation center axis parallel to the light axis with respect to the second member, a first adjustment portion moving the second member in the first direction with respect to the first member, and a second adjustment portion rotating the third member around the rotation center axis with respect to the second member, and an operation portion of the first adjustment portion and an operation portion of the second adjustment portion are placed at the same side.

In the projector according to the aspect of the invention, the operation portion of the first adjustment portion and the operation portion of the second adjustment portion are placed at the same side. For that reason, it is possible to perform both an operation of the first adjustment portion and an operation of the second adjustment portion from the same side. With this, it is possible to easily adjust the position of the light axis of the optical member.

It is possible to move the light axis of the optical member in a second direction orthogonal to the first direction by rotating the third member around the rotation center axis. For that reason, it is possible to easily move the light axis of the optical member in the second direction through the operation from the same side as the first adjustment portion by, for example, a screw or the like advancing and retreating in the first direction. Accordingly, it is possible to prevent the adjustment mechanism from being complicated.

As described above, in the projector according to the aspect of the invention, it is possible to perform a positional adjustment of the light axis of the optical member in the first direction and the second direction from the same side and prevent the adjustment mechanism from being complicated. Accordingly, it is possible to obtain a projector having a structure capable of reducing time and efforts for adjusting the position of the light axis of the optical member while preventing the adjustment mechanism from being complicated.

The projector according to the aspect of the invention may be configured such that the optical member is a lens.

According to this configuration, it is possible to adjust a position of the lens by the adjustment mechanism and adjust a direction of light guided by the lens. With this, it is possible to guide light with high precision and improve utilization efficiency of light in an optical system of the projector.

The projector according to the aspect of the invention may be configured such that the first adjustment portion includes a first screw member of which a head portion is an operation portion of the first adjustment portion, a first screw hole is formed in one of the first member and the second member, a first through hole is formed at the head portion side of the first screw member rather than the first screw hole in the other of the first member and the second member, and the first screw member extends in the first direction, penetrates into the first through hole, and is screwed into the first screw hole.

According to this configuration, it is possible to adjust the position of the light axis of the optical member with high precision by a simple configuration.

The projector according to the aspect of the invention may be configured such that the first through hole is formed in the first member, the first screw hole is formed in the second member, the second member includes a second member body and a swinging member held swingably with respect to the second member body, and the first screw hole is formed in the swinging member.

According to this configuration, it is possible to absorb deviation by the swinging member even when deviation occurs between a position where the first through hole is formed and a position where the first screw hole is formed and prevent the first screw member from being inclined. Especially, when the position where the first through hole is formed is largely separated in the first direction from the position where the first screw hole is formed, if deviation occurs between the position where the first through hole is formed and the position where the first screw hole is formed and thus the first screw member is inclined, moment exerted to the first screw member may easily become large. For that reason, effects with the swinging member are significant.

The projector according to the aspect of the invention may be configured such that the second adjustment portion includes a second screw member of which a head portion is an operation portion of the second adjustment portion, a second screw hole is formed in one of the second member and the third member, a second through hole is formed at the head portion side of the second screw member rather than the second screw hole in the other of the second member and the third member, the second screw hole and the second through hole are located at positions different from the rotation center axis in a second direction orthogonal to both the light axis and the first direction, and the second screw member extends in the first direction, penetrates into the second through hole, and is screwed into the second screw hole.

According to this configuration, it is possible to adjust the light axis of the optical member with high precision by a simple configuration.

The projector according to the aspect of the invention may be configured such that the second screw hole is formed in the second member and the second through hole is formed in the third member.

According to this configuration, when the second adjustment portion is operated, it is easy to operate the second adjustment portion without rotating the second screw hole.

The projector according to the aspect of the invention may be configured such that a casing accommodating the optical member and the adjustment mechanism is further included and the casing includes a casing body which includes an installation portion in which the optical member is provided through the adjustment mechanism, the casing body includes a bottom portion and the wall raised from an outer edge of the bottom portion, and the operation portion of the first adjustment portion and the operation portion of the second adjustment portion are placed at the side opposite to the bottom portion.

According to this configuration, it is easy to operate the first adjustment portion and the second adjustment portion in a state where the adjustment mechanism is installed in the installation portion of the casing body.

The projector according to the aspect of the invention may be configured such that the first member, the second member, and the third member are arranged to be overlapped when viewed along a third direction parallel to the light axis and the installation portion includes clamping units clamping and holding the first member, the second member, and the third member in the third direction.

According to this configuration, it is possible to prevent disengagement of linkage between respective members while making it possible for respective members to be relatively movable.

The projector according to the aspect of the invention may be configured such that the casing further includes a lid portion covering the bottom portion attached to an end portion located at the side opposite to another bottom portion of the wall, an adjusting hole penetrating through the lid portion is formed in the lid portion, and the operation portion of the first adjustment portion and the operation portion of the second adjustment portion are capable of being viewed from outside of the casing through the adjusting hole.

According to this configuration, it is possible to adjust the position of the light axis of the optical member through the adjusting hole without detaching the lid portion. With this, it is possible to time and efforts for readjusting the position of the light axis of the optical member.

The projector according to the aspect of the invention may be configured such that the casing further includes a lid portion covering the bottom portion attached to an end portion located at the side opposite to another bottom portion of the wall and the lid portion is not in contact with the adjustment mechanism may also be adopted.

According to this configuration, it is easy to perform adjustment of the light axis of the optical member by the adjustment mechanism in a state where the lid portion is attached to the casing body.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
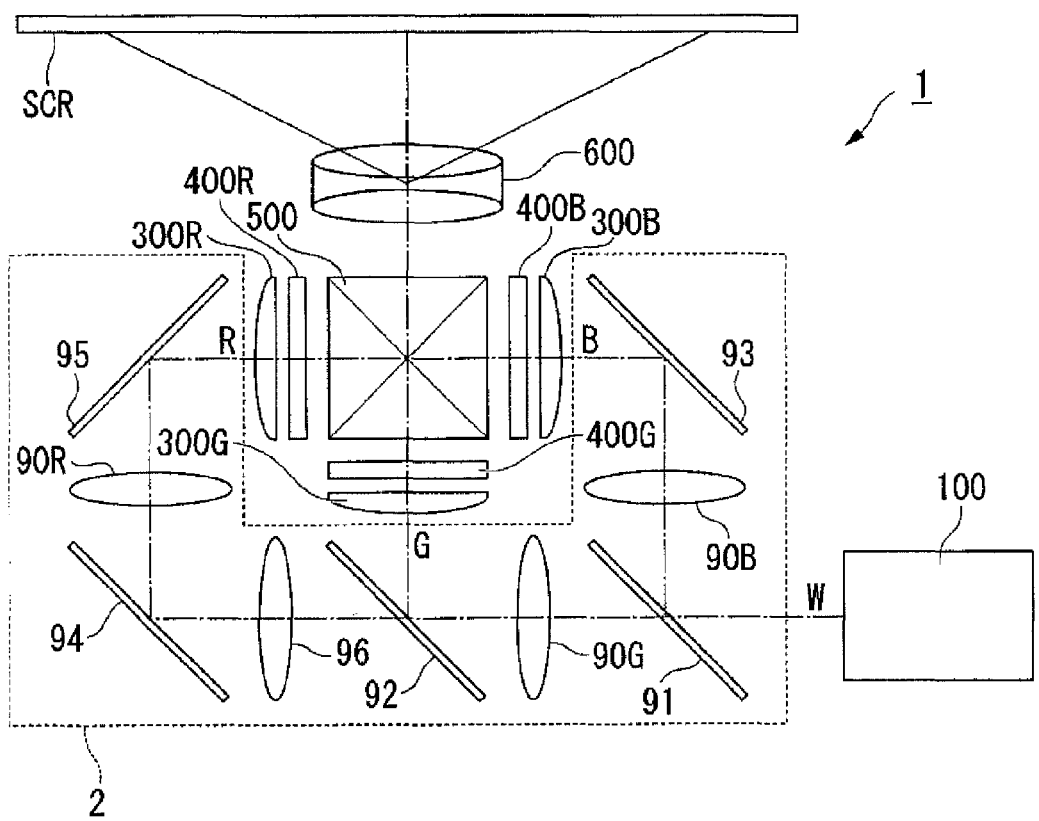
FIG. 1 is a schematic configuration diagram illustrating a projector of an embodiment.

In the following, a projector according to an embodiment of the invention will be described with reference to the drawings. A scope of the invention is not limited to the embodiments to be described below and may be changed arbitrary within a technical spirit of the invention. In the drawings to be described below, in each configuration, respective structures may be different from actual structure in the scale or the number in order to make each configuration easy to understand.

FIG. 1 is a schematic configuration diagram illustrating a projector 1 of the embodiment. A projector 1 illustrated in FIG. 1 is a projection type image display device that displays a color image on a screen SCR. The projector 1, as illustrated in FIG. 1, includes a light source device (light source) 100, a color separation and light guide optical system 2, liquid crystal light modulation devices (light modulation devices) 400R, 400G, and 400B that correspond to respective color light beam of red light, green light, blue light, a cross dichroic prism 500, and a projection optical device 600.

The light source device 100 emits white light W toward the color separation and light guide optical system 2. A configuration of the light source device 100 is not particularly limited as long as the light source device 100 is able to emit light.

The color separation and light guide optical system 2 includes dichroic mirrors 91 and 92, reflection mirrors 93, 94, and 95, field lenses (optical member) 90R, 90G, and 90B, and a relay lens 96. The color separation and light guide optical system 2 separates white light W from the light source device 100 into red light R, green light G, and blue light B and guides red light R, green light G and blue light B to liquid crystal light modulation devices 400R, 400G, and 400B that respectively correspond to red light R, green light G and blue light B.

The field lens 300R, 300G, and 300B are arranged between the color separation and light guide optical system 2 and the liquid crystal light modulation devices 400R, 400G, and 400B.

The dichroic mirror 91 is a dichroic mirror which allows the green light component and the red light component to pass and reflects the blue light component.

The dichroic mirror 92 is a dichroic mirror which allows the red light component to pass and reflects the green light component.

The reflection mirror 93 is a reflection mirror which reflects the blue light component.

The reflection mirrors 94 and 95 are reflection mirrors which reflect the red light component.

Blue light B reflected by the dichroic mirror 91 passes through the field lens 90B and is reflected by the reflection mirror 93, passes through the field lens 300B, and is incident on an image forming area of the liquid crystal light modulation device 400B for blue light.

Green light G and red light R transmitted through the dichroic mirror 91 passes through the field lens 90G and is incident on the dichroic mirror 92.

Green light G reflected by the dichroic mirror 92 passes through the field lens 300G, and is incident on an image forming area of the liquid crystal light modulation device 400G for green light.

Red light R passing through the dichroic mirror 92 is incident on an image forming area of the liquid crystal light modulation device 400R for red light through the relay lens 96, the reflection mirror 94 at an incidence side, the field lens 90R, the reflection mirror 95 at an emission side, and the field lens 300R.

Light emitted from the light source device 100 is incident on each field lens and a direction of incident light is adjusted by each field lens. Specifically, the field lenses 90R and 300R adjust a direction of red light R which is incident on the liquid crystal light modulation device 400R. The field lenses 90G and 300G adjust a direction of green light G which is incident on the liquid crystal light modulation device 400G. The field lenses 90B and 300B adjust a direction of blue light B which is incident on the liquid crystal light modulation device 400B.

The liquid crystal light modulation devices 400R, 400G, and 400B modulate white light W, which is made incident through the color separation and light guide optical system 2 and comes from the light source device 100, according to image information to thereby form image light. That is, the liquid crystal light modulation devices 400R, 400G, and 400B modulate light passing through the field lenses 90R, 90G, 90B. The liquid crystal light modulation devices 400R, 400G, and 400B form image light corresponding respective color light beams that are made incident respectively. Although not illustrated, incident side polarizing plates are respectively arranged between respective field lenses 300R, 300G, and 300B and respective liquid crystal light modulation devices 400R, 400G, and 400B and emission side polarizing plates are respectively arranged between the cross dichroic prism 500 and each of the liquid crystal light modulation devices 400R, 400G, and 400B.

The cross dichroic prism 500 is an optical element for synthesizing respective image light beams emitted from respective liquid crystal light modulation devices 400R, 400G, and 400B to form a color image. The cross dichroic prism 500 has four right-angle prisms stuck thereto and has a substantially square shape in a plan view and dielectric multilayer films are formed in X-shaped interface in which the right-angle prisms are stuck to each other.

The color image emitted from the cross dichroic prism 500 is incident on the projection optical device 600.

The projection optical device 600 enlarges and projects the incident color image (image light), that is, light modulated by the liquid crystal light modulation devices 400R, 400G, and 400B toward the screen SCR. With this, an image is formed on the screen SCR.

Figure 2:
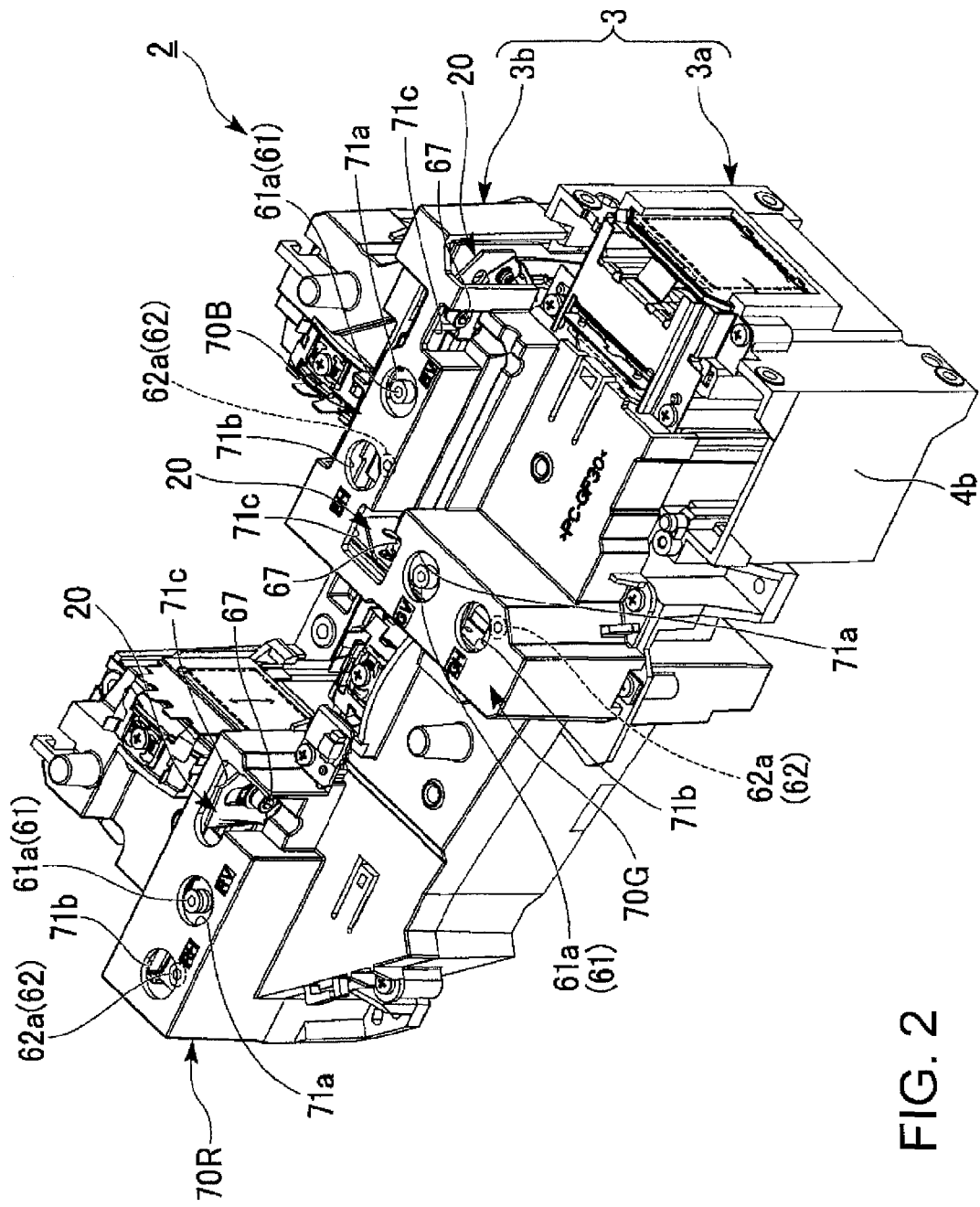
FIG. 2 is a perspective view illustrating a color separation and light guide optical system of the embodiment.
Figure 3:
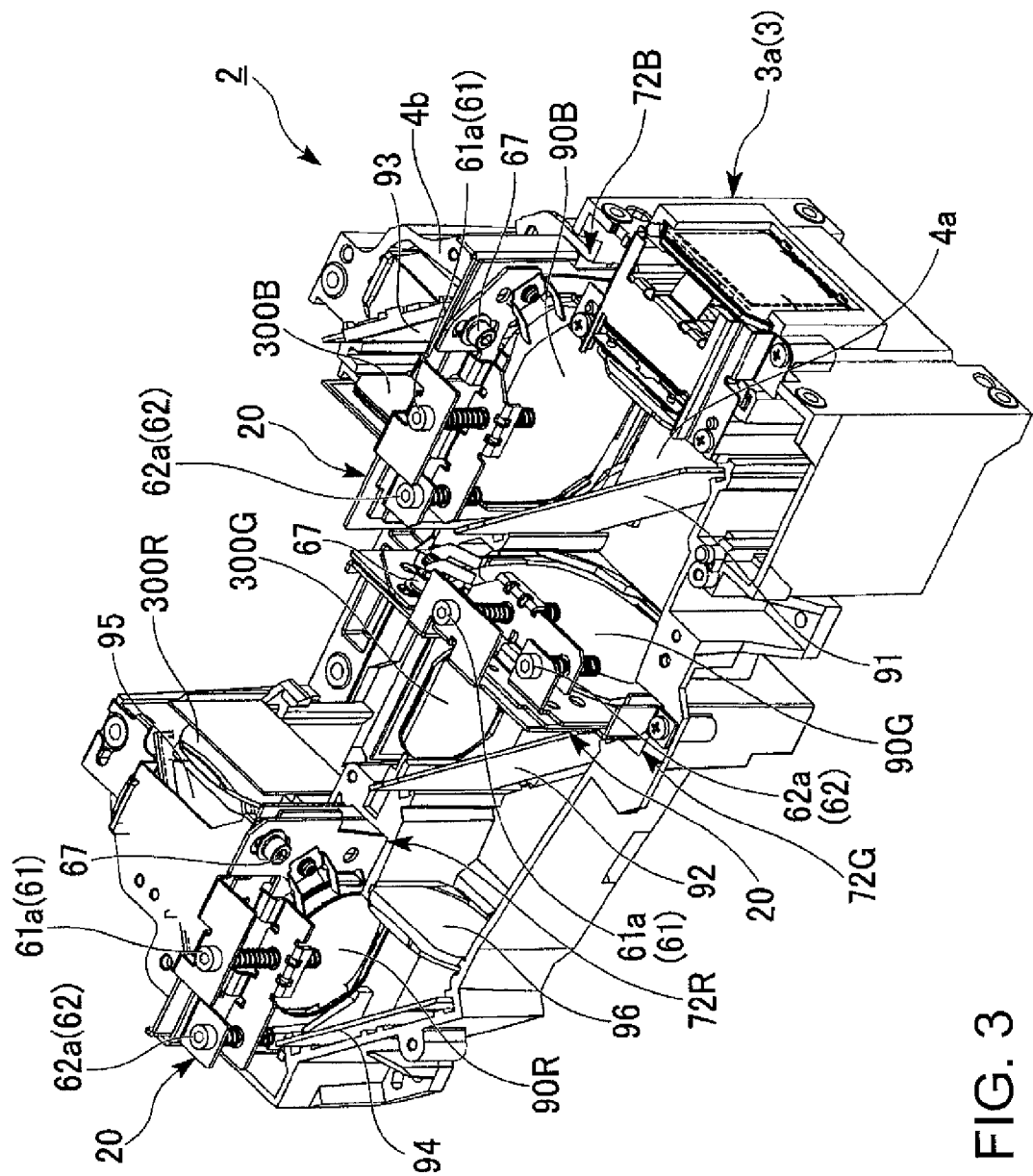
FIG. 3 is a perspective view illustrating a portion of the color separation and light guide optical system of the embodiment.
Figure 4:
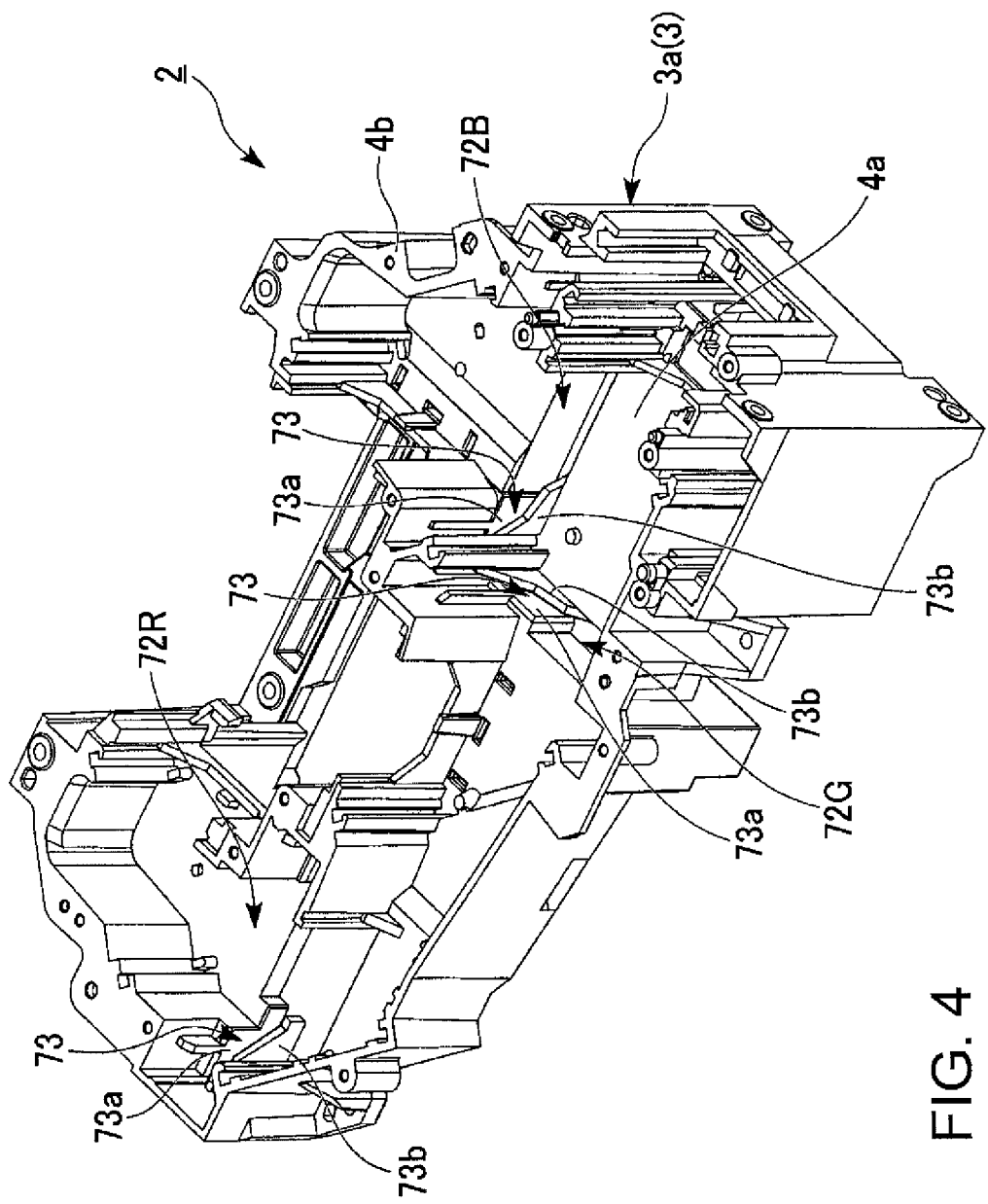
FIG. 4 is another perspective view illustrating the portion of the color separation and light guide optical system of the embodiment.

FIG. 2 to FIG. 4 are perspective views illustrating the color separation and light guide optical system 2. In FIG. 3, illustration of the lid portion 3b is omitted. In FIG. 4, only a casing body 3a is illustrated.

As illustrated in FIG. 2 and FIG. 3, the color separation and light guide optical system 2 includes the casing 3. The casing 3 accommodates the dichroic mirrors 91 and 92, the reflection mirrors 93, 94, and 95, the field lenses 90R, 90G, and 90B, the relay lens 96, an adjustment mechanism 20 which will be described later, and the like.

As illustrated in FIG. 2, the casing 3 includes the casing body 3a and a lid portion 3b. As illustrated in FIG. 4, the casing body 3a includes a bottom portion 4a and a wall 4b raised from an outer edge of the bottom portion 4a.

In the following, description will be made by regarding a direction in which the wall 4b rises as the vertical direction, regarding a bottom portion 4a side with respect to the wall 4b as the lower side, and regarding the side opposite to the bottom portion 4a as the upper side. The direction in which the wall 4b rises is not limited to the vertical direction, the "upper side" and the "lower side" are names for explaining simply a positional relationship between respective units and do not limit the actual embodiment.

The casing body 3a includes field lens installation units (installation portion) 72R, 72G, and 72B. The field lens installation unit 72R is a portion in which the field lens 90R is installed. The field lens installation unit 72G is a portion in which the field lens 90G is installed. The field lens installation unit 72B is a portion in which the field lens 90B is installed.

In the embodiment, configurations of the field lens installation units 72R, 72G, and 72B are the same configuration and thus, in the following description, description may be made only on the field lens installation unit 72B as a representative.

As illustrated in FIG. 3, the field lens 90B is installed through the adjustment mechanism 20 in the field lens installation unit 72B. Description on the adjustment mechanism 20 will be made in detail at the rear paragraphs. As illustrated in FIG. 4, the field lens installation unit 72B includes clamping units 73 which clamp and hold the adjustment mechanism 20.

The clamping units 73 are provided in the vicinity of the bottom portion 4a. The clamping units 73 clamp and hold a first member 30, a second member 40, and a third member 50, which will be described later, in a direction (third direction) parallel to a light axis AX of the field lens 90B in the adjustment mechanism 20. As illustrated in FIG. 4, the clamping units 73 are provided at both sides by clamping a light path within, for example, the casing body 3a, between the clamping units 73. The clamping units 73 each include a first clamping wall 73a and a second clamping wall 73b.

The first clamping wall 73a is, for example, a portion of the wall 4b.

The second clamping wall 73b is opposed to the first clamping wall 73a through a gap in a direction of the light axis AX of the field lens 90B installed in the field lens installation unit 72B. The second clamping wall 73b extends from the wall 4b to the light path side within the casing 3. The lower end of the second clamping wall 73b is connected with the bottom portion 4a.

The lid portion 3b, as illustrated in FIG. 2, is attached to an end portion located at the side (upper side) opposite to the bottom portion 4a of the wall 4b. The lid portion 3b covers the upper side of the bottom portion 4a. The lid portion 3b includes adjustment mechanism cover units 70R, 70G, and 70B covering the upper portion of the adjustment mechanism 20.

The adjustment mechanism cover unit 70R covers the upper portion of the adjustment mechanism. 20 holding the field lens 90R. The adjustment mechanism cover unit 70G covers the upper portion of the adjustment mechanism. 20 holding the field lens 90G. The adjustment mechanism cover unit 70B covers the upper portion of the adjustment mechanism. 20 holding the field lens 90B.

In the embodiment, configurations of the adjustment mechanism cover units 70R, 70G, and 70B are the same configuration and thus, in the following description, description may be made only on the adjustment mechanism cover unit 70B as a representative.

In the adjustment mechanism cover unit 70B, a first adjusting hole (adjusting hole) 71a, a second adjusting hole (adjusting hole) 71b, and a lens position fixing hole 71c are formed.

The first adjusting hole 71a and the second adjusting hole 71b penetrate through the lid portion 3b in the vertical direction. A shape of the first adjusting hole 71a in a plan view and a shape of the second adjusting hole 71b in a plan view are, for example, a circular shape.

The lens position fixing hole 71c penetrates through the lid portion 3b in the direction parallel to the light axis AX of the field lens 90B.

Next, description will be made on the adjustment mechanisms 20. Each of the adjustment mechanisms 20 is provided for each of the field lenses 90R, 90G, and 90B. Each adjustment mechanism 20 holds each of the field lenses 90R, 90G, and 90B and is installed in each of the field lens installation units 72R, 72G, and 72B of the casing body 3a. The adjustment mechanism 20 is a mechanism for adjusting the light axes of the field lenses 90R, 90G, and 90B. In the embodiment, a shape when viewed along the light axes of the field lenses 90R, 90G, and 90B held in the adjustment mechanisms 20 is substantially the same as a shape obtained by chamfering four corners of a square.

The configurations of the respective adjustment mechanisms 20 provided in the field lenses 90R, 90G, and 90B are the same configuration and thus, in the following description, description may be made only on the adjustment mechanism 20 holding the field lens 90B as a representative.

Figure 5:
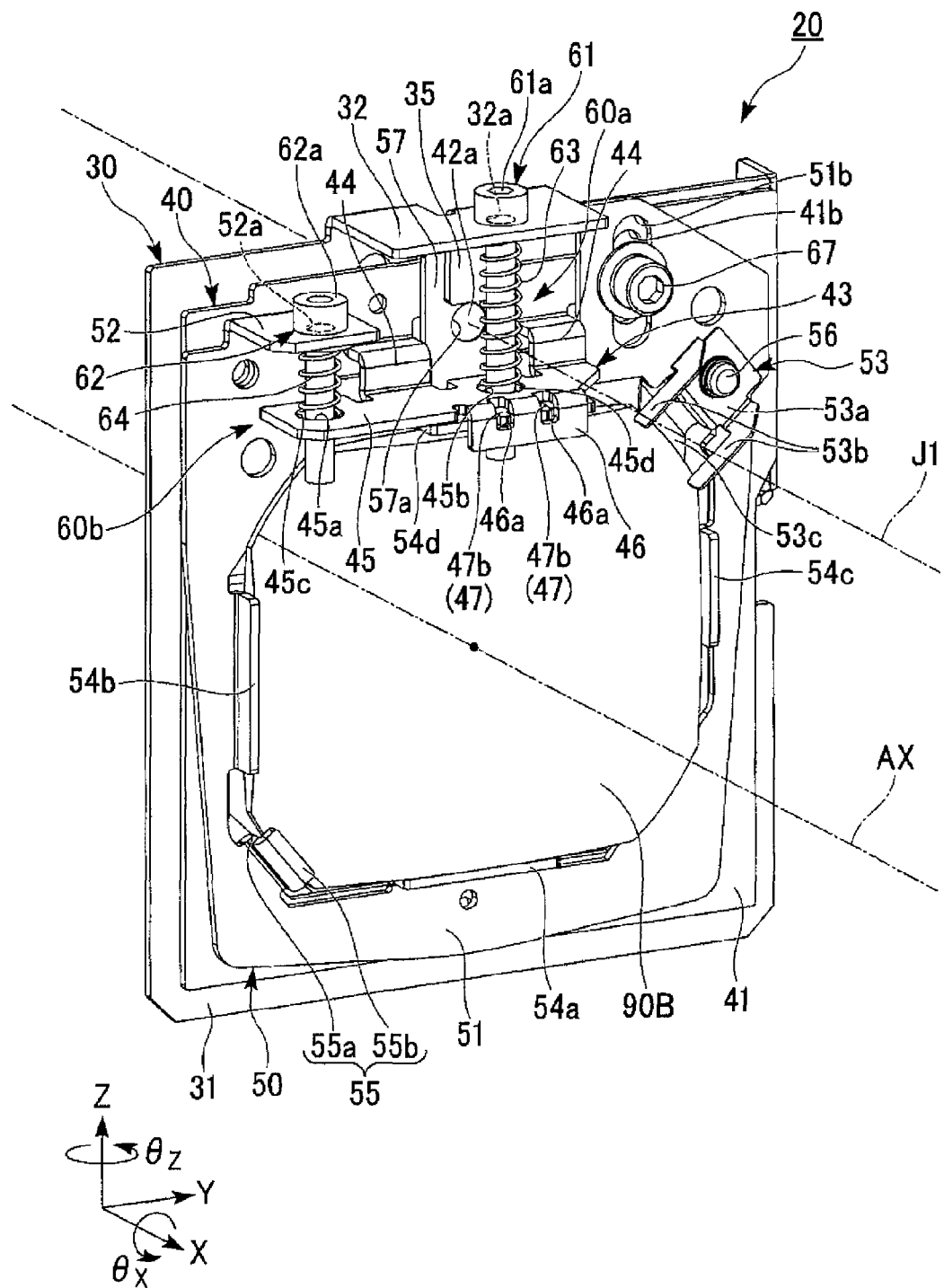
FIG. 5 is a perspective view illustrating an adjustment mechanism of the embodiment.
Figure 6:
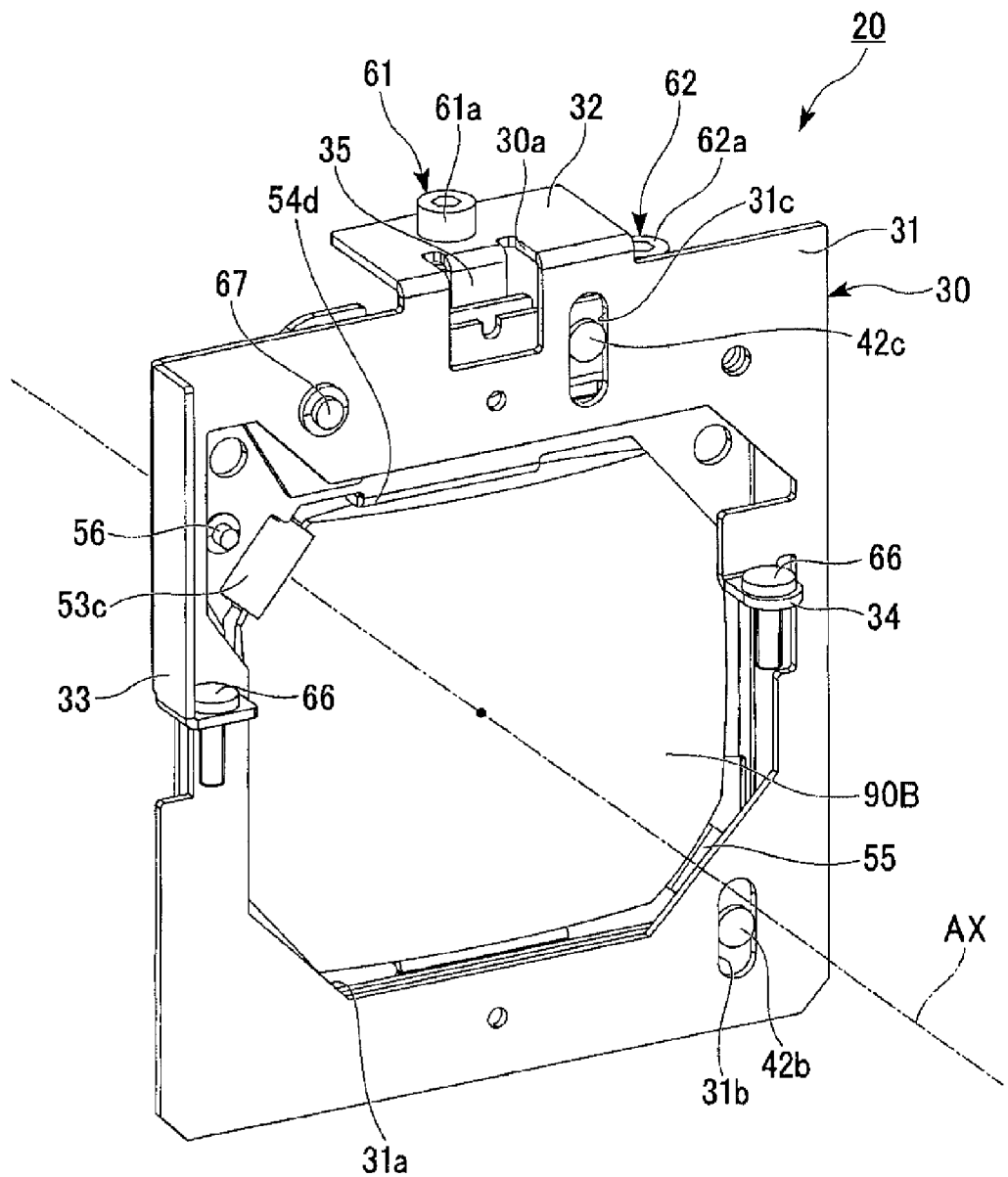
FIG. 6 is another perspective view illustrating the adjustment mechanism of the embodiment.
Figure 7:
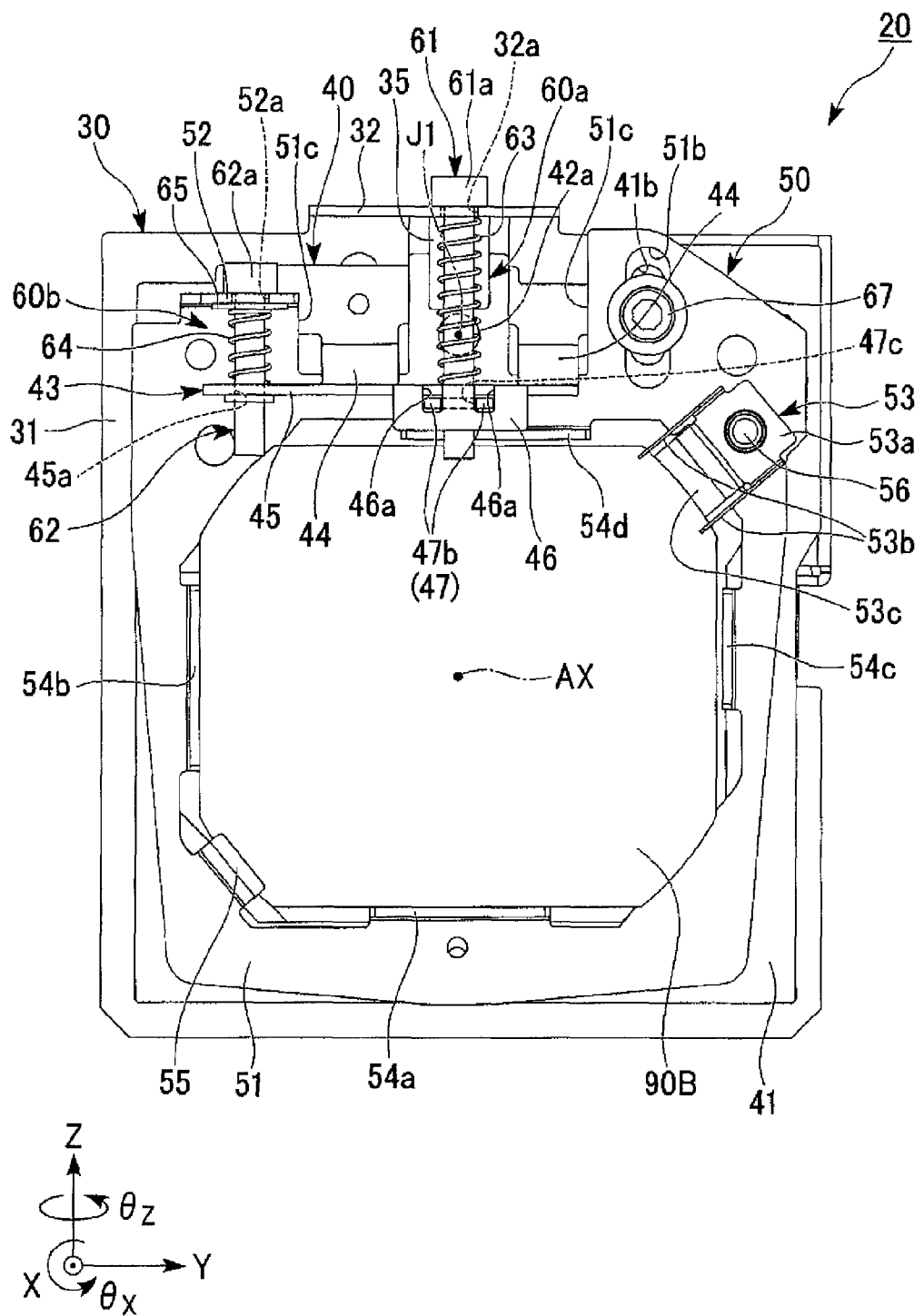
FIG. 7 is a front view illustrating the adjustment mechanism of the embodiment.
Figure 8:
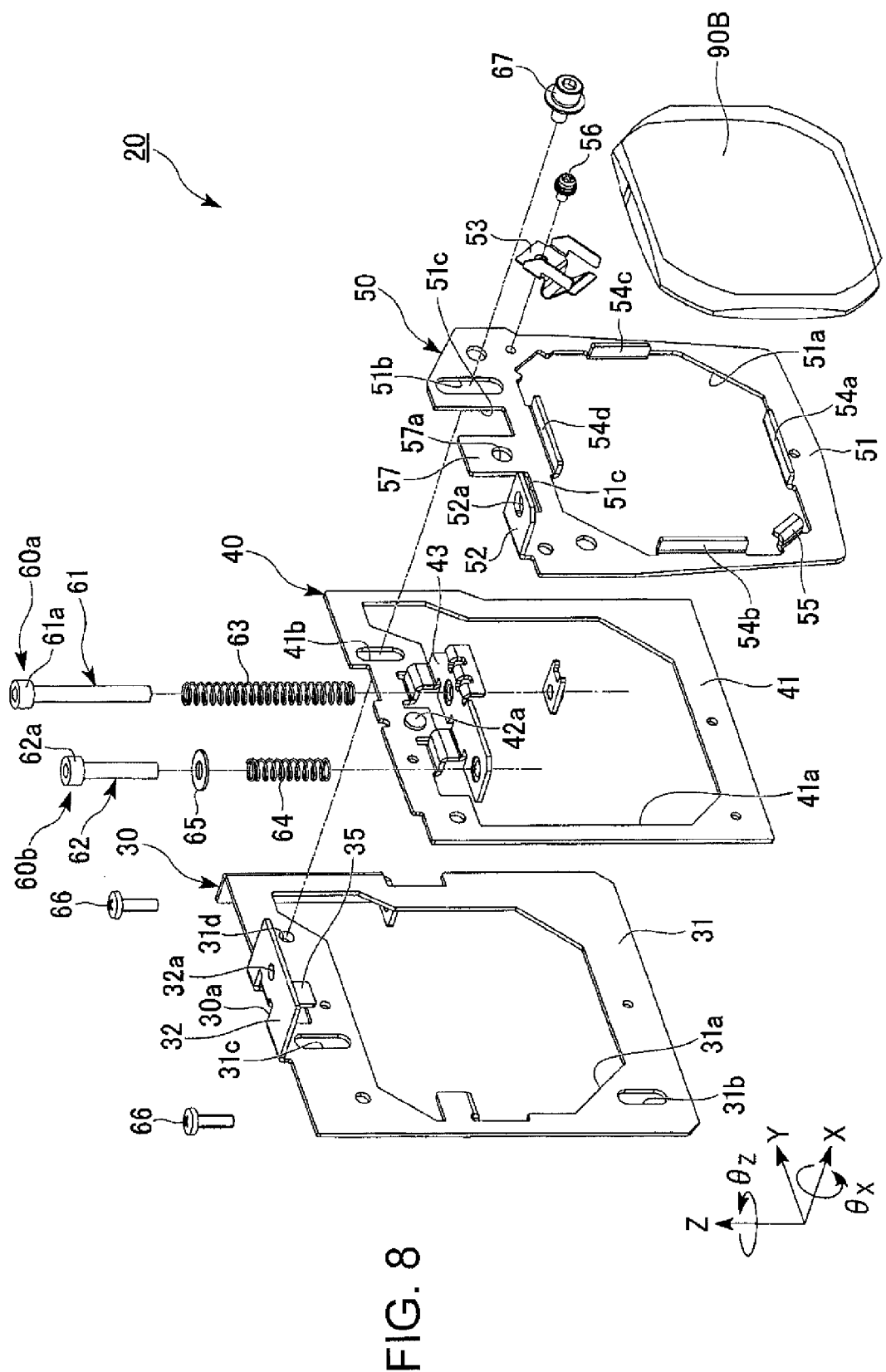
FIG. 8 is an exploded perspective view illustrating the adjustment mechanism of the embodiment.

FIG. 5 is a perspective view when the adjustment mechanism 20 is viewed obliquely from a side, to which light is incident, of the field lens 90B. FIG. 6 is a perspective view when the adjustment mechanism 20 is viewed obliquely from a side, from which light is emitted, of the field lens 90B. FIG. 7 is a view (in the following, referred to as a front view) when the adjustment mechanism 20 is viewed from a side, to which light is incident, of the field lens 90B toward a side, from which light is emitted, of the field lens 90B. FIG. 8 is an exploded perspective view illustrating the adjustment mechanism 20.

In the following, description will be made by appropriately illustrating the three-dimensional orthogonal coordinate system (XYZ coordinate system) in each figure in description of the positional relationship between respective units of the adjustment mechanism 20. The Z-axis direction is regarded as a direction parallel to a direction (for example, the vertical direction in the embodiment) in which the wall 4b rises. The X-axis direction is regarded as a direction parallel to the light axis AX of the field lens 90B orthogonal to the Z-axis direction. The Y-axis direction is regarded as a direction orthogonal to both the Z-axis direction and the X-axis direction.

In the following description, the Z-axis direction may simply be referred to as a "longitudinal direction (first direction)", the X-axis direction may simply be referred to as a "light axis direction (third direction)", and the Y-axis direction may simply be referred to as a "lateral direction (second direction)". The positive-direction side (+Z side) of the longitudinal direction may be referred to as an "upper side" and the negative-direction side (-Z side) of the longitudinal direction may be referred to as a "lower side". The positive-direction side (+X side) of the light axis direction may be referred to as a "front side" and the negative-direction side (-X side) of the light axis direction may be referred to as a "rear side". The "front side" of the light axis direction is a side, to which light is incident, of the field lens 90B. The "rear side" of the light axis direction is a side, from which light is emitted, of the field lens 90B. The positive-direction side (+Y side) of the lateral direction may be referred to as a "right side" and the negative-direction side (-Y side) of the lateral direction may be referred to as a "left side". The "front side", the "rear side", the "right side", and the left side are names for explaining simply a positional relationship between respective units and do not limit the actual embodiment.

The adjustment mechanism 20, as illustrated in FIG. 5 to FIG. 8, includes a first member 30, a second member 40, a third member 50, a first adjustment portion 60a, a second adjustment portion 60b, and a fixing screw 67.

The first member 30 is fixed to the casing body 3a. The first member 30 has a plate shape spreading along a plane (YZ-plane) orthogonal to the light axis AX. In the embodiment, the first member 30 is a single member manufactured by, for example, sheet metal working. As illustrated in FIG. 6 and FIG. 8, the first member 30 includes a first frame unit 31, a first extension unit 32, fixing units 33 and 34, and a pressing unit 35.

The first frame unit 31 has a plate shape spreading along a plane (YZ-plane) orthogonal to the light axis AX. The first frame unit 31 has a frame shape in which a first light passing hole 31a penetrating through the first frame unit 31 in the light axis direction (X-axis direction) is formed in the center. A shape of the first light passing hole 31a when viewed from the front side (+X side) toward the rear side (-X side) (in the following, referred to as in a front view) is a polygonal shape. The first light passing hole 31a is slightly larger than the field lens 90B. An external shape of the first frame unit 31 in a front view is a substantially rectangular shape.

In the first frame unit 31, guide holes 31b and 31c penetrating through the first frame unit 31 in the light axis direction (X-axis direction) are formed. The guide holes 31b and 31c are long holes extending in the longitudinal direction (Z-axis direction). The guide hole 31b is formed in the vicinity of the left side (-Y side) end portion in the lower portion of the first frame unit 31. The guide hole 31c is formed at a position adjacent to the left side center in the upper portion of the first frame unit 31.

In the first frame unit 31, a fixed screw hole 31d penetrating through the first frame unit 31 in the light axis direction (X-axis direction) is formed. A female screw is formed on the inside surface of the fixed screw hole 31d. A shape of the fixed screw hole 31d in a front view is a circular shape. The fixed screw hole 31d is formed in the position adjacent to the right side (+Y side) in the upper portion of the first frame unit 31.

The first extension unit 32 extends to the front side (+X side) from approximately center in the lateral direction (Y-axis direction) in the upper side end portion of the first frame unit 31. The first extension unit 32 has a plate shape spreading along a plane (XY-plane) orthogonal to the longitudinal direction (Z-axis direction). As illustrated in FIG. 5, the front side end portion of the first extension unit 32 is positioned at the more front side than the second frame unit 41 and the third frame unit 51 which will be described later. A shape of the first extension unit 32 in a plan view is, for example, a rectangular shape elongated in the lateral direction.

As illustrated in FIG. 8, a first through hole 32a penetrating through the first extension unit 32 in the longitudinal direction (Z-axis direction) is formed in the first extension unit 32. The first through hole 32a is formed in the vicinity of the front side (+X side) end portion of the first extension unit 32. A shape of the first through hole 32a in a plan view is, for example, a circular shape. The first through hole 32a is formed at a side upper than first screw hole 47c which will be described later. As illustrated in FIG. 7, a position of the center of the first through hole 32a in the lateral direction is the same as that of, for example, the position of the field lens 90B in the lateral direction of the light axis AX.

As illustrated in FIG. 6, the fixing units 33 and 34 protrude from the first frame unit 31 to the rear side (−X side). Holes through which screws 66 pass are respectively formed in fixing units 33 and 34. The screws 66 are screwed into screw holes formed in the casing body 3a and not illustrated through the holes formed in the fixing units 33 and 34. With this, the first member 30 is fixed to the casing body 3a.

In the first member 30, a hole 30a is formed across the first frame unit 31 and the first extension unit 32. The hole 30a penetrates through the center of the lateral direction (Y-axis direction) in the light axis direction (X-axis direction) in the end portion of the upper side of the first frame unit 31 and is opened to the upper side. The hole 30a penetrates through the approximate center of the lateral direction in the longitudinal direction (Z-axis direction) in the end portion of the rear side (−X side) of the first extension unit 32 and is opened to the rear side.

The pressing unit 35 extends downward from the inner edge of the front side (+X side) among the inner edge of the hole 30a. As illustrated in FIG. 5 and FIG. 7, the pressing unit 35 has a plate shape of a rectangular elongated in the longitudinal direction (Z-axis direction). The pressing unit 35 is positioned at the more front side than the second frame unit 41 and the third frame unit 51 which will be described later and overlaps a portion of the second frame unit 41 and a portion of the third frame unit 51 in the light axis direction (X-axis direction) in a front view.

The second member 40 is a member attached to be movable in the longitudinal direction (Z-axis direction) orthogonal to the light axis AX with respect to the first member 30. The second member 40 is arranged at the front side (+X side) of the first frame unit 31 in the first member 30.

Figure 9:
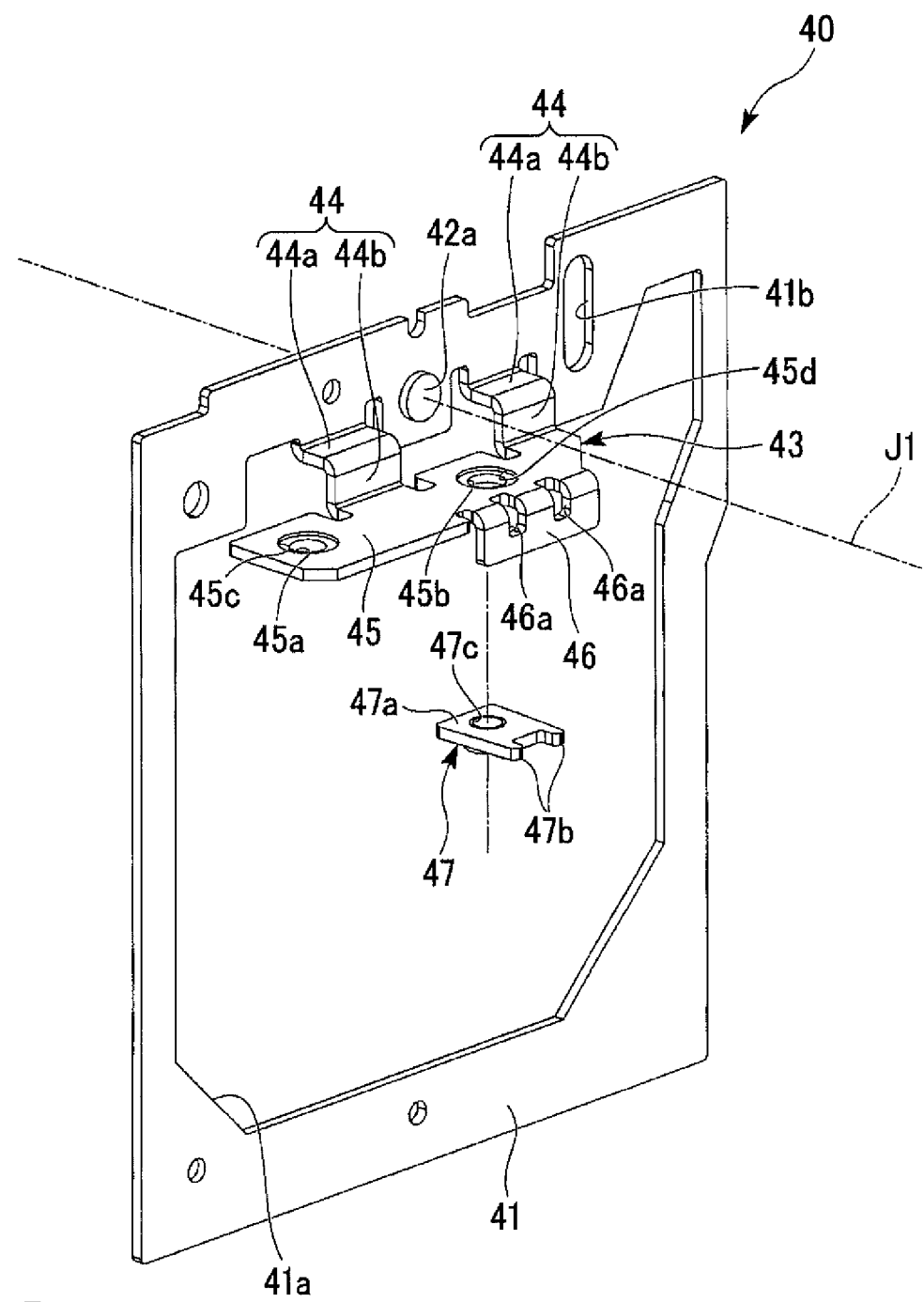
FIG. 9 is a perspective view illustrating a second member of the embodiment.
Figure 10:
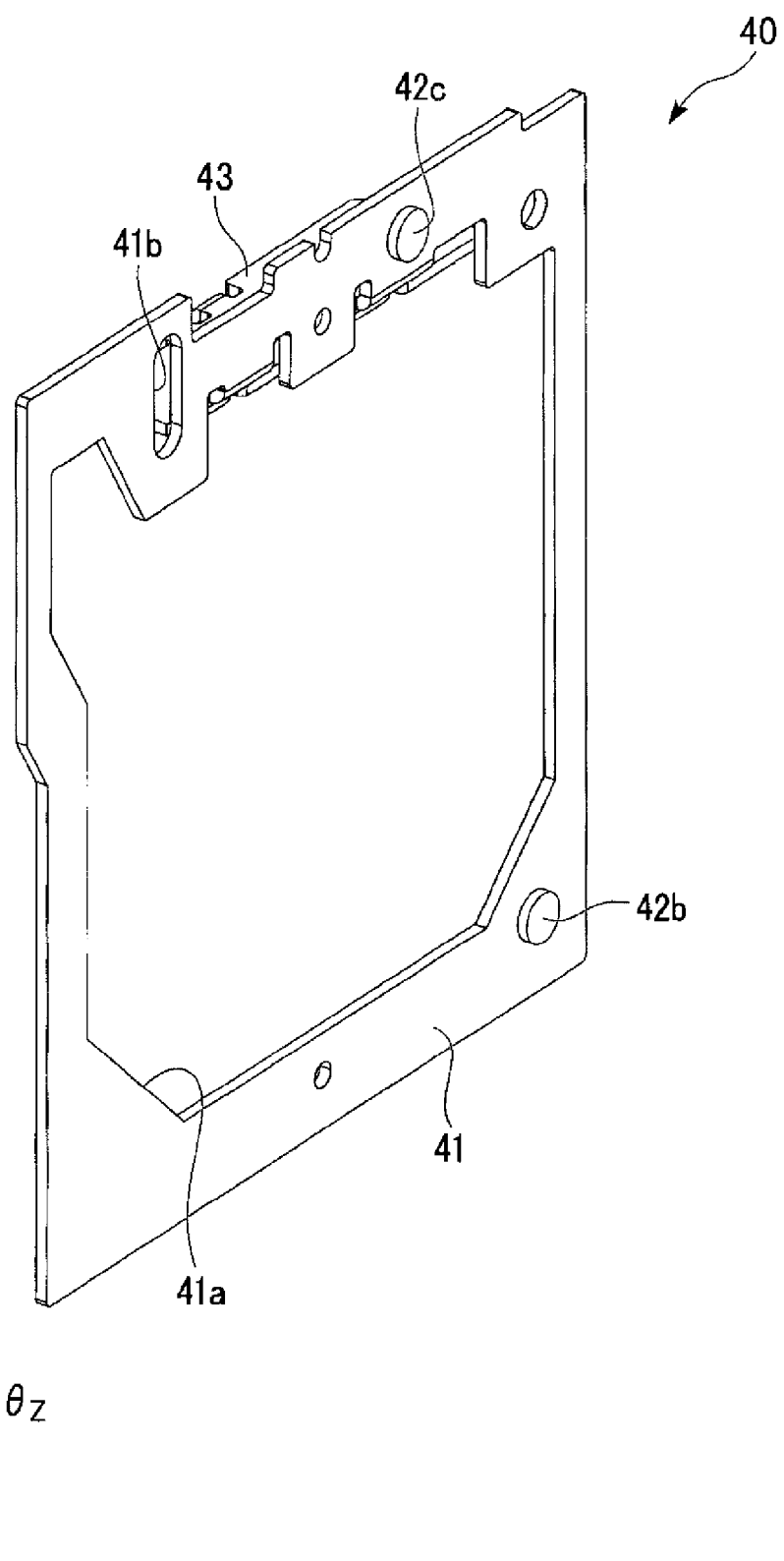
FIG. 10 is another perspective view illustrating the second member of the embodiment.

FIG. 9 is a perspective view of the second member 40 when viewed obliquely from the front side (+X side). FIG. 10 is a perspective view of the second member 40 when viewed obliquely from the rear side (−X side). In FIG. 9, the plate nut 47 is illustrated to be separated at the lower side.

As illustrated in FIG. 9 and FIG. 10, the second member 40 includes the second frame unit 41, a rotation shaft portion 42a, engagement units 42b and 42c, a second extension unit 43, and a plate nut (swinging member) 47.

The second frame unit 41 has a plate shape spreading along a plane (YZ-plane) orthogonal to the light axis AX. The second frame unit 41 has a frame shape in which a second light passing hole 41a penetrating through the second frame unit 41 in the light axis direction (X-axis direction) is formed in the center. A shape of the second light passing hole 41a is a polygonal shape in a front view. The second light passing hole 41a is slightly larger than the field lens 90B. An external shape of the second frame unit 41 in a front view is a substantially rectangular shape.

In the second frame unit 41, a fixing hole 41b penetrating through the second frame unit 41 in the light axis direction (X-axis direction) is formed. The fixing hole 41b is a long hole which extends in the longitudinal direction (Z-axis direction). The fixing hole 41b is formed at a position adjacent to the right side (+Y side) in the upper portion of the second frame unit 41. The fixing hole 41b overlaps the fixed screw hole 31d of the first member 30 in a front view.

The rotation shaft portion 42a, as illustrated in FIG. 9, is a columnar portion protruding from the surface of the front side (+X side) of the second frame unit 41 to the front side. The rotation shaft portion 42a is positioned at the upper portion of the second frame unit 41. The position of the lateral direction (Y-axis direction) of the rotation shaft portion 42a is the center of the second frame unit 41 in the lateral direction. The rotation center axis J1 passing through the center of the rotation shaft portion 42a is parallel to the light axis AX of the field lens 90B. As illustrated in FIG. 7, the position of the rotation center axis J1 in the lateral direction is the same as that in the lateral direction of the light axis AX. The rotation center axis J1 is positioned at a side upper than the light axis AX.

In the embodiment, the rotation shaft portion 42a is a separate member from, for example, the second frame unit 41. For example, the rotation shaft portion 42a has a small diameter portion of which the outer diameter becomes smaller in the rear side (−X side) and the small diameter portion is fixed to a hole formed in the second frame unit 41 by being subjected to pressed-insertion or the like from the front side (+X side) such that the rotation shaft portion 42a is fixed to the second frame unit 41.

The engagement units 42b and 42c, as illustrated in FIG. 10, are columnar portions protruding from the surface of the rear side (−X side) of the second frame unit 41 to the rear side. The engagement unit 42b is provided in the vicinity of the left side (−Y side) end portion in the lower portion of the second frame unit 41. The engagement unit 42c is provided at a position adjacent to the left side center in the upper portion of the second frame unit 41.

As illustrated in FIG. 6, the engagement unit 42b is inserted into the guide hole 31b of the first member 30 and is engaged with the inside surface of the guide hole 31b. The engagement unit 42b is movable along the guide hole 31b in the longitudinal direction (Z-axis direction). Both ends of the lateral direction (Y-axis direction) of the engagement unit 42b are in slide contact with the inside surface of the guide hole 31b and movement of the engagement unit 42b in the lateral direction with respect to the guide hole 31b is regulated.

The engagement unit 42c is inserted into the guide hole 31c of the first member 30 and is engaged with the inside surface of the guide hole 31c. The engagement unit 42c is movable along the guide hole 31c in the longitudinal direction (Z-axis direction). Both ends of the lateral direction (Y-axis direction) of the engagement unit 42c are in slide contact with the inside surface of the guide hole 31c and movement of the engagement unit 42c in the lateral direction with respect to the guide hole 31c is regulated.

The engagement units 42b and 42c are engaged with inside surfaces of the guide holes 31b and 31c as described above such that the second member 40 is attached to be movable in the longitudinal direction with respect to the first member 30. At two sites in the upper and lower portions, movement of the engagement units 42b and 42c in the lateral direction (Y-axis direction) with respect to the guide holes 31b and 31c are regulated and thus, rotation and movement in the lateral direction with respect to the first member 30 of the second member 40 are regulated.

In the embodiment, the engagement units 42b and 42c are separate members from, for example, the second frame unit 41. For example, the engagement units 42b and 42c have a small diameter portion of which the outer diameter becomes smaller in the front side (+X side) and the small diameter portion is fixed to a hole formed in the second frame unit 41 by being subjected to pressed-insertion or the like from the rear side (−X side) such that the engagement units 42b and 42c are fixed to the second frame unit 41.

The second extension unit 43, as illustrated in FIG. 9, is provided to protrude more to the front side (+X side) than the second frame unit 41. The second extension unit 43 includes connection units 44, a second extension portion body 45, and a plate nut holding unit 46.

The connection units 44 includes a first connection unit 44a extending from the second frame unit 41 to the front side (+X side) and a second connection unit 44b extending downward from the front side end portion of the first connection unit 44a. The first connection unit 44a is connected with an inner edge of the upper side among inner edges of the second light passing hole 41a. The connection units 44 are respectively provided at both sides of the rotation shaft portion 42a in the lateral direction (Y-axis direction).

The second extension portion body 45 is connected with end portions of the lower side of two second connection units 44b. The second extension portion body 45 has a plate shape spreading along a plane (XY-plane) orthogonal to the longitudinal direction. A shape of the second extension portion body 45 in a plan view is the approximate rectangular shape elongated in the lateral direction (Y-axis direction).

As illustrated in FIG. 5, the second extension portion body 45 is positioned at the more front side (+X side) than the third frame unit 51 of the third member 50. The second extension portion body 45 is positioned at a side lower than the first extension unit 32. An upper surface of a portion positioned at the center of the second member 40 in the lateral direction (Y-axis direction) among the second extension portion body 45 is opposed to the lower surface of the first extension unit 32 in the longitudinal direction (Z-axis direction) through a gap.

As illustrated in FIG. 9, in the second extension portion body 45, a second screw hole 45a penetrating through the second extension portion body 45 in the longitudinal direction (Z-axis direction) is formed. A female screw is formed on the inside surface of the second screw hole 45a. The second screw hole 45a is formed in the left side (−Y side) end portion of the second extension portion body 45. The second screw hole 45a is located at a position different from the rotation center axis J1 in the lateral direction (Y-axis direction) orthogonal to both the light axis AX and the longitudinal direction.

In the second extension portion body 45, an insertion hole 45b penetrating through the second extension portion body 45 in the longitudinal direction (Z-axis direction) is formed. A shape of the insertion hole 45b in a plan view is, for example, a circular shape. In the embodiment, the position of the center of the insertion hole 45b in the lateral direction (Y-axis direction) is, for example, the same as the position of the rotation center axis J1 in the lateral direction.

Concave portions 45c and 45d are formed on the upper surface of the second extension portion body 45. The concave portions 45c and 45d are recessed downward from the upper surface of the second extension portion body 45. The concave unit 45c has a circular shape spreading radially outside of the second screw hole 45a from an inner edge of the second screw hole 45a. The concave portion 45d has a circular shape spreading radially outside of the insertion hole 45b from an inner edge of the insertion hole 45b.

A plate nut holding unit 46 extends downward from the front side (+X side) end portion of the second extension portion body 45. The plate nut holding unit 46 has a plate shape spreading along the plane (YZ-plane) orthogonal to the light axis AX. As illustrated in FIG. 7, a shape of the plate nut holding unit 46 in a front view is, for example, a rectangular shape elongated in the lateral direction (Y-axis direction). The plate nut holding unit 46 is positioned at the center of the second member 40 in the lateral direction. The center of the plate nut holding unit 46 is located at the same position as the rotation center axis J1 in the lateral direction. The lower end portion of the plate nut holding unit 46 is positioned upper than the field lens 90B.

As illustrated in FIG. 9, two holding holes 46a penetrating through the plate nut holding unit 46 in the light axis direction (X-axis direction) are formed in the plate nut holding unit 46. Two holding holes 46a are formed at both sides of the plate nut holding unit 46 by clamping the center of the plate nut holding unit 46 in the lateral direction (Y-axis direction). The holding holes 46a are formed at the upper portion of the plate nut holding unit 46 and opened upward.

In the embodiment, the second frame unit 41 and the second extension unit 43 are integrally manufactured as a single member, for example, manufactured by sheet metal working. In the embodiment, the single member including the second frame unit 41 and the second extension unit 43 corresponds to the second member body.

The plate nut 47 is a single plate shaped member and a separate member from the second member body. The plate nut 47 is elastically deformable in the longitudinal direction. The plate nut 47 includes a plate nut body 47a and an engagement protrusion 47b.

The plate nut body 47a has a rectangular plate shape spreading along the plane (XY-plane) orthogonal to the longitudinal direction. In the plate nut body 47a, the first screw hole 47c penetrating through the plate nut body 47a in the longitudinal direction (Z-axis direction) is formed. A female screw is formed on the inside surface of the first screw hole 47c. The first screw hole 47c is formed in the approximate center of the plate nut body 47a. The first through hole 32a, the insertion hole 45b, and the first screw hole 47c overlap each other in a plan view.

The engagement protrusions 47b protrude from the front side (+X side) end portion of the plate nut body 47a to the front side. The engagement protrusions 47b are provided at both ends of the end portion at the front side of the plate nut body 47a in the lateral direction (Y-axis direction). As illustrated in FIG. 5, two engagement protrusions 47b are respectively inserted into the holding holes 46a of the plate nut holding unit 46 from the rear side (−X side) and engaged with the inside surface of the holding hole 46a. With this, the plate nut 47 is engaged with the second extension unit 43.

The plate nut 47 is held swingably with respect to the second extension unit 43 (plate nut holding unit 46) which is a portion of the second member body. Specifically, a gap is provided between the engagement protrusion 47b and the inside surface of the holding hole 46a in the lateral direction (Y-axis direction) and the plate nut 47 is movable in the lateral direction only by the gap. In the light axis direction (X-axis direction), the plate nut 47 is movable within a range to the extent that at least a portion of the engagement protrusion 47b is inserted into the holding hole 46a. As such, the plate nut 47 is swingable with respect to the second extension unit 43 within the plane (XY-plane) orthogonal to the longitudinal direction.

The third member 50 is attached to the second member 40 to be rotatable around the rotation center axis J1 (±θx direction) parallel to the light axis AX. The third member 50 is arranged at the front side (+X side) of the second frame unit 41 in the second member 40. As illustrated in FIG. 5 and FIG. 8, the third member 50 includes the third frame unit 51, the third extension unit 52, ribs 54a, 54b, 54c, and 54d, the lens engagement unit 55, and the pressing member 53.

The third frame unit 51 has a plate shape spreading along the plane (YZ-plane) orthogonal to the light axis AX. The third frame unit 51 has a frame shape in which a third light passing hole 51a penetrating through the third frame unit 51 in the light axis direction (X-axis direction) is formed in the center. A shape of the third light passing hole 51a in a front view is substantially the same as a shape obtained by chamfering four corners of a square. That is, shape of the third light passing hole 51a in a front view is substantially the same as the shape of the field lens 90B in a front view. The third light passing hole 51a is slightly larger than the field lens 90B. An external shape of the third frame unit 51 in a front view is a substantially rectangular shape.

In the third frame unit 51, the fixing hole 51b penetrating through the third frame unit 51 in the light axis direction (X-axis direction) is formed. The fixing hole 51b is a long hole extending in the longitudinal direction (Z-axis direction). The fixing hole 51b is formed adjacent to the right side (+Y side) in the upper portion of the third frame unit 51.

As illustrated in FIG. 5, the first frame unit 31, the second frame unit 41, and the third frame unit 51 are arranged to be overlapped with each other from the rear side (−X side) toward the front side (+X side) in order in a front view. That is, the first member 30, the second member 40, and the third member 50 are arranged to be overlapped with each other along the light axis direction (X-axis direction) parallel to the light axis AX.

As illustrated in FIG. 7 and FIG. 8, in the third frame unit 51, inserted concave portions 51c are formed from the upper side edge to the lower side in the third frame unit 51. The inserted concave portions 51c are formed at both sides of the third frame unit 51 in the lateral direction (Y-axis direction) by clamping the center of the third frame unit 51. A shape of the inserted concave portions 51c in a front view is, for example, a substantially rectangular shape.

In the inserted concave portions 51c, the connection unit 44 of the second extension unit 43 is inserted from the rear side (−X side) to the front side (+X side) in the second member 40. With this, the second extension portion body 45 of the second extension unit 43 is positioned at the more front side than the third frame unit 51 of the third member 50.

In the third frame unit 51, the protruded plate portion 57 is provided between the inserted concave portions 51c in the lateral direction (Y-axis direction). The protruded plate portion 57 protrudes upward. A shape of the protruded plate portion 57 in a front view is a substantially rectangular shape.

As illustrated in FIG. 8, the fitting hole 57a penetrating through the protruded plate portion 57 in the light axis direction (X-axis direction) is formed in the protruded plate portion 57. A shape of the fitting hole 57a in a front view is a circular shape. As illustrated in FIG. 5, the rotation shaft portion 42a of the second member 40 is fitted inside of the fitting hole 57a. With this, the third member 50 is attached to the second member 40 to be rotatable around the rotation center axis J1 (θx direction) of the rotation shaft portion 42a.

The third extension unit 52 extends to the front side (+X side) from the left side (−Y side) end portion in the upper side end portion of the third frame unit 51. The third extension unit 52 has a plate shape spreading along the plane (XY-plane) orthogonal to the longitudinal direction. A shape of the third extension unit 52 in a plan view is, for example, a substantially rectangular shape.

The third extension unit 52 is positioned at a side upper than the second extension portion body 45. The lower surface of the third extension unit 52 is opposed to the upper surface through a gap in the longitudinal direction (Z-axis direction) in the left side (−Y side) end portion of the second extension portion body 45. As illustrated in FIG. 7, the third extension unit 52 is positioned at a side lower than the first extension unit 32 and positioned at a more left side than the first extension unit 32.

As illustrated in FIG. 8, the second through hole 52a penetrating through the third extension unit 52 in the longitudinal direction (Z-axis direction) is formed in the third extension unit 52. The second through hole 52a is formed in the vicinity of the front side (+X side) end portion of the third extension unit 52. A shape of the second through hole 52a in a plan view is, for example, a circular shape. As illustrated in FIG. 7, the second through hole 52a is formed at a side upper than the second screw hole 45a. The second through hole 52a is located at a position different from the rotation center axis J1 in the lateral direction (Y-axis direction). The second through hole 52a and the second screw hole 45a overlap each other in a plan view.

The ribs 54a, 54b, 54c, and 54d protrude to the front side (+X side) from the inner edge of the third light passing hole 51a of the third frame unit 51. The rib 54a is provided on the lower side inner edge of the third light passing hole 51a. The rib 54b is provided on the left side (−Y side) inner edge of the third light passing hole 51a. The rib 54c is provided on the right side (+Y side) inner edge of the third light passing hole 51a. The rib 54d is provided on the upper side inner edge of the third light passing hole 51a.

The rib 54a and rib 54d extend to the lateral direction (Y-axis direction). The rib 54b and rib 54c extend to the longitudinal direction (Z-axis direction). The rib 54a and the rib 54b are in contact with the outer edge of the field lens 90B. The rib 54c and rib 54d are placed with a gap from the field lens 90B.

The lens engagement unit 55, as illustrated in FIG. 5, is a portion engaged with the field lens 90B. The lens engagement unit 55 is provided in the left side (−Y side) corner portion of an inner edge at the lower side of the third light passing hole 51a. The lens engagement unit 55 includes a protruding portion 55a and an engagement portion body 55b.

The protruding portion 55a protrudes to the front side (+X side) from the inner edge of the third light passing hole 51a. The engagement portion body 55b is connected with the end portion at the front side of the protruding portion 55a. The engagement portion body 55b extends obliquely upward from the protruding portion 55a to the right side (+Y side). The engagement portion body 55b is in contact with a surface at the front side of the field lens 90B from the front side. With this, the lens engagement unit 55 is engaged with the field lens 90B.

The third frame unit 51, the third extension unit 52, the ribs 54a, 54b, 54c, and 54d, and the lens engagement unit 55 are integrally manufactured as a single member. The single member including the third frame unit 51, the third extension unit 52, the ribs 54a, 54b, 54c, and 54d, and the lens engagement unit 55, for example, is manufactured by sheet metal working.

The pressing member 53, as illustrated in FIG. 5 and FIG. 8, is fixed to the surface at the front side (+X side) of the third frame unit 51 by the screw 56. The pressing member 53 is fixed to the corner portion of the right side (+Y side) in the upper portion of the third frame unit 51. That is, the pressing member 53 and the lens engagement unit 55 are arranged at sides opposite to each other to clamp the third light passing hole 51a on the diagonal line of the third frame unit 51 passing through the lens engagement unit 55.

As illustrated in FIG. 5, the pressing member 53 includes a fixing plate unit 53a, a locking unit 53b, and a plate spring unit 53c. The fixing plate unit 53a is fixed to the surface of the front side of the third frame unit 51 by the screw 56. The locking unit 53b extends to the left side (−Y side) obliquely downward from the fixing plate unit 53a. A pair of the locking units 53b are provided in a direction orthogonal to the direction to which the locking unit 53b with a gap in a front view extends. As illustrated in FIG. 7, the tip of the locking unit 53b is positioned at the front side (+X side) of the field lens 90B. The tip of the locking unit 53b overlaps the field lens 90B in a front view. The locking unit 53b is opposed to the surface at the front side of the field lens 90B through a gap.

The plate spring unit 53c is an elastically deformable portion. As illustrated in FIG. 5, the plate spring unit 53c is connected with a field lens 90B side end portion of the fixing plate unit 53a. The plate spring unit 53c extends to the rear side (−X side) from the fixing plate unit 53a and the tip of the plate spring unit 53c is folded back to the front side (+X side). The tip of the plate spring unit 53c is in contact with the surface at the rear side of the field lens 90B from the rear side. The plate spring unit 53c applies a force to the field lens 90B from the rear side toward the front side and applies a force to the field lens 90B toward an oblique downward left side (−Y side), that is, from the pressing member 53 toward the lens engagement unit 55.

The field lens 90B is pushed from the rear side (−X side) to the front side (+X side) by the plate spring unit 53c of the pressing member 53 and the engagement portion body 55b of the lens engagement unit 55 is engaged in the surface of the front side (+X side) of the field lens 90B. With this, the field lens 90B is positioned in the light axis direction (X-axis direction) and held in the third member 50.

The field lens 90B is pushed toward the lens engagement unit 55 by the plate spring unit 53c of the pressing member 53. With this, the outer edge of the field lens 90B is pressed against the protruding portion 55a, the rib 54a, and the rib 54b of the lens engagement unit 55. Accordingly, the field lens 90B is positioned in the lateral direction (Y-axis direction) and the longitudinal direction (Z-axis direction) and held in the third member 50.

As such, the third member 50 holds the field lens 90B in a state where the third member 50 is positioned in the light axis direction (X-axis direction), the lateral direction (Y-axis direction), and the longitudinal direction (Z-axis direction). In the state where the field lens 90B is held in the third member 50, the light axis AX of the field lens 90B passes through the first light passing hole 31a of the first frame unit 31, the second light passing hole 41a of the second frame unit 41, and the third light passing hole 51a of the third frame unit 51. With this, light is able to be passed through the field lens 90B held in the adjustment mechanism 20 in the light axis direction (X-axis direction).

The first adjustment portion 60a, as illustrated in FIG. 8, includes the first screw member 61 and the first spring 63.

The first screw member 61 extends in the longitudinal direction (Z-axis direction). The first head portion 61a which is the head portion of the first screw member 61 is the upper side end portion of the first screw member 61. The first head portion 61a is an operation portion of the first adjustment portion 60a. The first head portion 61a is placed at the upper side. More specifically, a head portion hole of the first head portion 61a is placed at the upper side. The head portion hole of the first head portion 61a is, for example, a hexagonal hole.

As illustrated in FIG. 5 and FIG. 7, the first screw member 61 is passed through the first through hole 32a of the first extension unit 32 from upward in the first member 30 and is screwed into the first screw hole 47c of the plate nut 47 through the insertion hole 45b of the second extension portion body 45 in the second member 40. The first head portion 61a is located at a position upward of the first through hole 32a. The lower surface of the first head portion 61a is in contact with the upper surface of the first extension unit 32. As such, the first through hole 32a is formed at a side closer to the first head portion 61a than the first screw hole 47c.

The outer diameter of the first screw member 61 is smaller than the inner diameter of the first through hole 32a and the inner diameter of the insertion hole 45b. A gap is provided between the outside surface of the first screw member 61 and inside surface of the first through hole 32a. A gap is provided between the outside surface of the first screw member 61 and the inside surface of the insertion hole 45b.

The first spring 63 is a compression coil spring extending in the longitudinal direction (Z-axis direction). The first screw member 61 is passed through inside of the first spring 63. The first spring 63 is arranged between the first extension unit 32 of the first member 30 and the second extension portion body 45 of the second member 40 in the longitudinal direction. The upper side end portion of the first spring 63 is in contact with the lower surface of the first extension unit 32. The lower side end portion of the first spring 63 is in contact with the upper surface of the second extension portion body 45. More specifically, as illustrated in FIG. 5, the lower side end portion of the first spring 63 is arranged within the concave portion 45d formed in the second extension portion body 45 and is in contact with the bottom surface of the concave portion 45d.

The first spring 63 applies an upward force to the first member 30 through the first extension unit 32. The first spring 63 applies a downward force to the second member 40 through the second extension portion body 45. With this, the first spring 63 applies a force to a direction to separate the first member 30 and the second member 40 from each other in the longitudinal direction (Z-axis direction) with respect to the first member 30 and the second member 40. As a result, the upper surface of the first extension unit 32 is pressed against the lower surface of the first head portion 61a by the first spring 63.

The second adjustment portion 60b, as illustrated in FIG. 8, includes a second screw member 62, a second spring 64, and a washer 65.

The second screw member 62 extends in the longitudinal direction (Z-axis direction). A second head portion 62a which is a head portion of the second screw member 62 is the upper side end portion of the second screw member 62. The second head portion 62a is an operation portion of the second adjustment portion 60b. The second head portion 62a is placed at the upper side. More specifically, a head portion hole of the second head portion 62a is placed at the upper side. The head portion hole of the second head portion 62a is, for example, a hexagonal hole.

As such, a first head portion 61a which is an operation portion of the first adjustment portion 60a and a second head portion 62a which is an operation portion of the second adjustment portion 60b are placed at the same side. As illustrated in FIG. 3, in the embodiment, the first head portion 61a and the second head portion 62a are placed at the side (upper side) opposite to the bottom portion 4a.

In the present specification, the expression "an operation portion of a first adjustment portion and an operation portion of a second adjustment portion are placed at the same side" includes matters that the operation portion of the first adjustment portion and the operation portion of the second adjustment portion can be operated from the same side with respect to the adjustment mechanism. That is, as long as each operation portion can be operated from the same side with respect to the adjustment mechanism, a direction directed to the operation portion of the first adjustment portion and a direction directed to the operation portion of the second adjustment portion may not need to be the same closely. Specifically, for example, it is sufficient that the direction directed to the first head portion 61a and the direction directed to the second head portion 62a are substantially the same, for example, the direction directed to the second head portion 62a may also be slightly inclined with respect to the direction directed to the first head portion 61a.

As illustrated in FIG. 2, the first head portion 61a (head portion hole of first head portion 61a) which is the operation portion of the first adjustment portion 60a is capable of being recognized from the outside of the casing 3 through the first adjusting hole 71a. The first head portion 61a is positioned inside of the first adjusting hole 71a in a plan view.

The second head portion 62a (head portion hole of second head portion 62a) which is the operation portion of the second adjustment portion 60b is capable of being recognized from the outside of the casing 3 through the second adjusting hole 71b. The second head portion 62a is positioned inside of the second adjusting hole 71b in a plan view.

As illustrated in FIG. 5 and FIG. 7, the second screw member 62 is passed through the second through hole 52a of the third extension unit 52 from upward in the third member 50 and is screwed into the second screw hole 45a of the second extension portion body 45 in the second member 40. The second head portion 62a is located at a position upward of the second through hole 52a. The lower surface of the second head portion 62a is in contact with the upper surface of the third extension unit 52. As such, the second through hole 52a is formed at a side closer to the second head portion 62a than the second screw hole 45a.

The outer diameter of the second screw member 62 is smaller than the inner diameter of the second through hole 52a. A gap is provided between the outside surface of the second screw member 62 and inside surface of the second through hole 52a.

The second spring 64 is a compression coil spring extending in the longitudinal direction (Z-axis direction). The second screw member 62 is passed through inside of the second spring 64. The second spring 64 is arranged between the third extension unit 52 of the third member 50 and the second extension portion body 45 of the second member 40 in the longitudinal direction. As illustrated in FIG. 7, the upper side end portion of the second spring 64 is in contact with the lower surface of the third extension unit 52 through the washer 65. The lower side end portion of the second spring 64 is in contact with the upper surface of the second extension portion body 45. More specifically, as illustrated in FIG. 5, the lower side end portion of the second spring 64 is arranged within the concave unit 45c formed in the second extension portion body 45 and is in contact with the bottom surface of the concave unit 45c.

The second spring 64 applies an upward force to the third member 50 through the third extension unit 52. The second spring 64 applies a downward force to the second member 40 through the second extension portion body 45. With this, the second spring 64 applies a force to a direction to separate the third member 50 and the second member 40 from each other in the longitudinal direction (Z-axis direction) with respect to the third member 50 and the second member 40. As a result, the upper surface of the third extension unit 52 is pressed against the lower surface of the second head portion 62a by the second spring 64.

As illustrated in FIG. 7, the second screw member 62 is passed through the washer 65. The upper surface of the washer 65 is in contact with the lower surface of the third extension unit 52. The washer 65 is pushed to the lower surface of the third extension unit 52 from the lower side by the second spring 64.

The fixing screw 67, as illustrated in FIG. 5 and FIG. 8, passes through the fixing hole 51b of the third member 50 and the fixing hole 41b of the second member 40 from the front side (+X side) and is screwed into the fixed screw hole 31d of the first member 30. The head portion hole of the fixing screw 67 is, for example, a hexagonal hole. The fixing screw 67 is fastened into the fixed screw hole 31d such that the first member 30, the second member 40, and the third member 50 are fixed to each other and the relative movement between respective members is regulated.

In a state where the fixing screw 67 is loosened, the second member 40 is movable in the longitudinal direction (Z-axis direction) with respect to the first member 30 and the third member 50 is rotatable around the rotation center axis J1 with respect to the second member 40. That is, in the present specification, matters that the second member 40 is movable in the longitudinal direction with respect to the first member 30 include matters that the second member 40 is movable in a state where the fixing screw 67 is loosened. In the present specification, matters that the third member 50 is rotatable around the rotation center axis J1 with respect to the second member 40 include matters that the third member 50 is rotatable in a state where the fixing screw 67 is loosened.

As illustrated in FIG. 2, the fixing screw 67 is capable of being viewed from outside of the casing 3 through the lens position fixing hole 71c. The fixing screw 67 is positioned at an inner side of the lens position fixing hole 71c when viewed along the light axis direction (X-axis direction).

As illustrated in FIG. 3, the lower portion of the adjustment mechanism 20 is fixed to the field lens installation unit 72B such that the adjustment mechanism 20 is fixed to the casing body 3a. The lower portion of the adjustment mechanism 20 is clamped between the first clamping wall 73a and the second clamping wall 73b of the clamping units 73 illustrated in FIG. 4. With this, the first member 30, the second member 40, and the third member 50 are clamped and held by the clamping units 73.

The adjustment mechanism 20 is provided at a position separated from the inside surface of the lid portion 3b in a state of being accommodated in the casing 3. That is, in a state where the adjustment mechanism 20 is accommodated in the casing 3, the lid portion 3b is not in contact with the adjustment mechanism 20.

The first adjustment portion 60a and the second adjustment portion 60b of the embodiment are operated to thereby make it possible to adjust a position of the light axis AX of the field lens 90B. In the following, description will be made on an adjustment method of the light axis AX of the field lens 90B using the adjustment mechanism 20.

Figure 11:
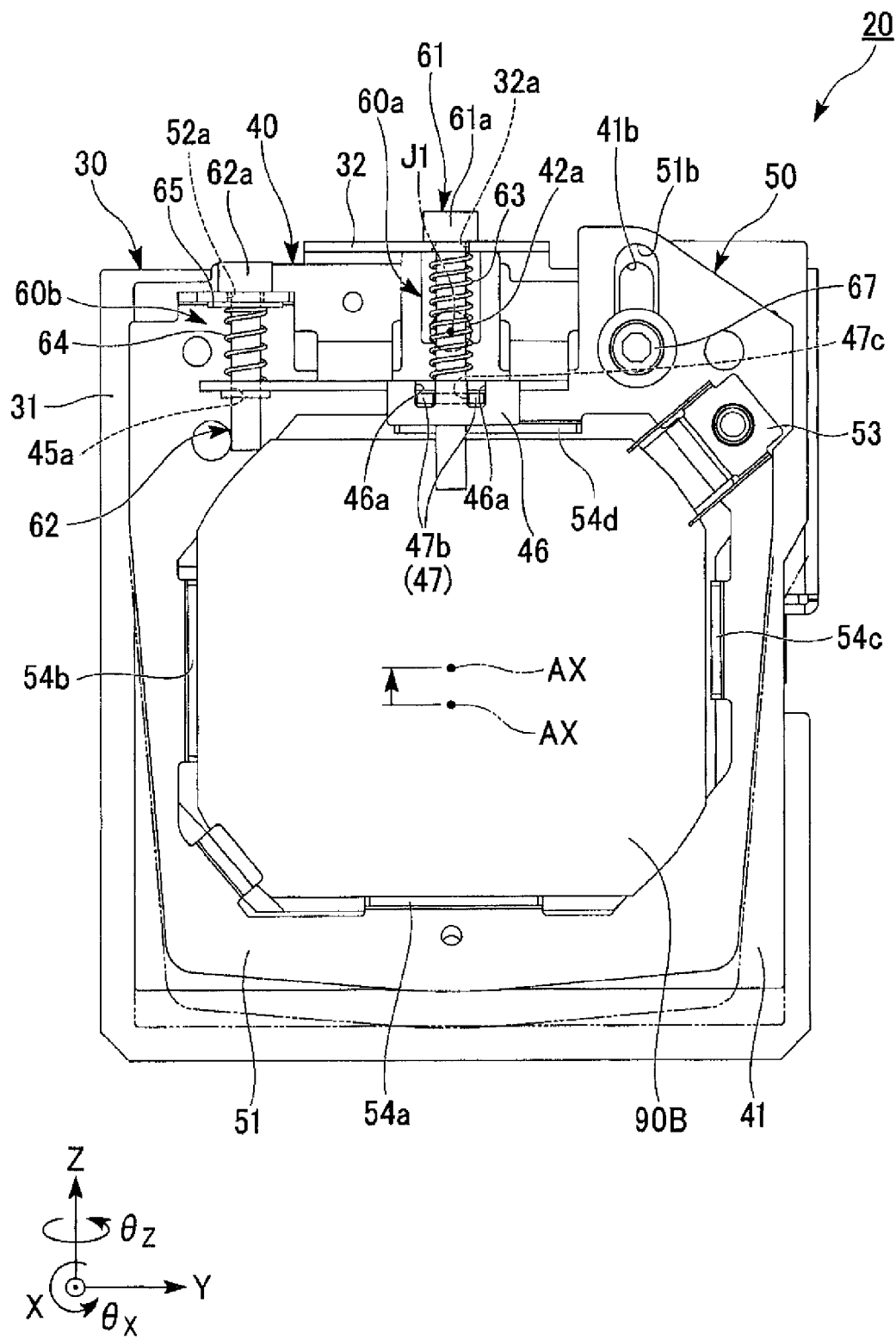
FIG. 11 is a diagram for explaining a positional adjustment of a field lens in a longitudinal direction by the adjustment mechanism of the embodiment.
Figure 12:
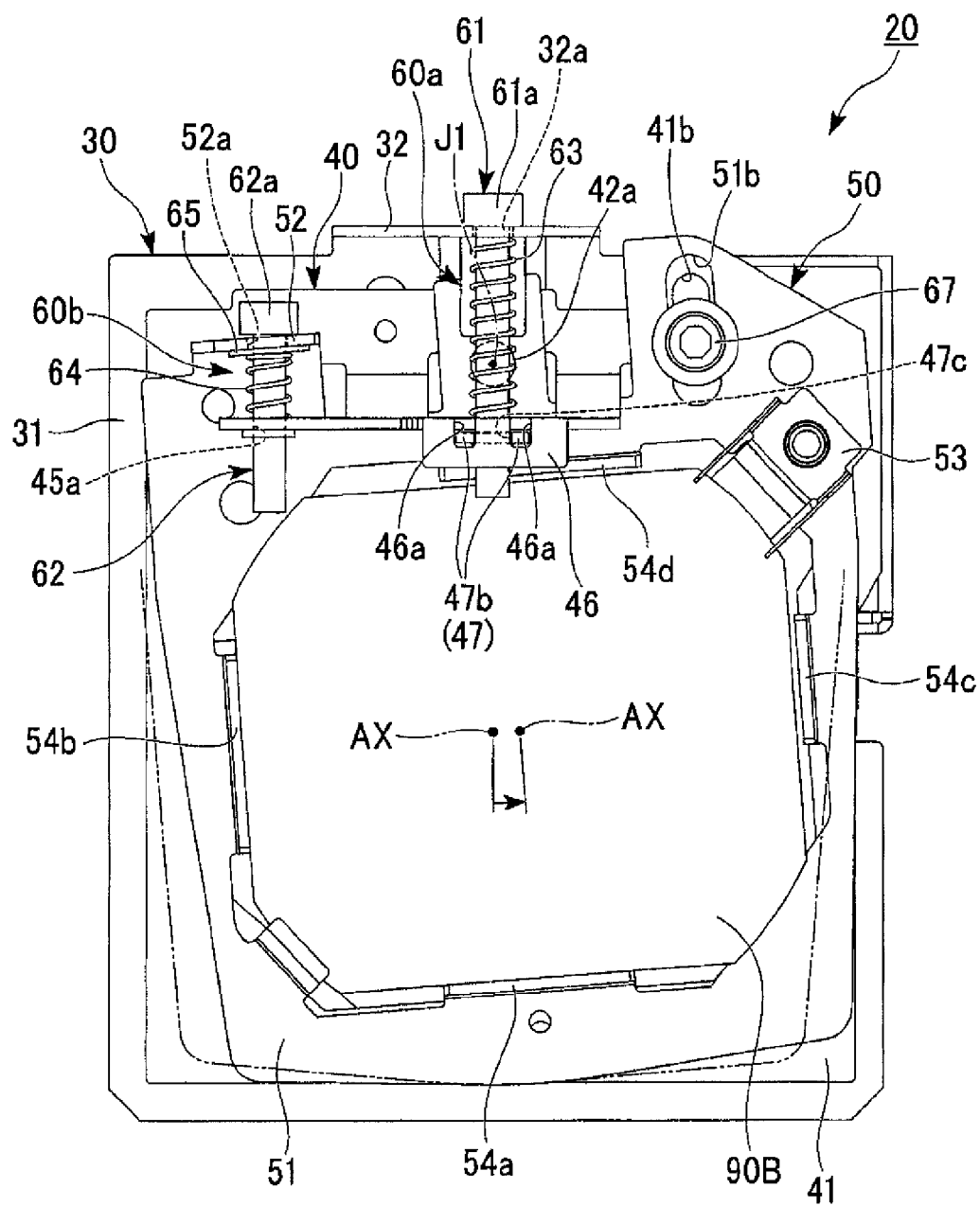
FIG. 12 is a diagram for explaining the positional adjustment of the field lens in a lateral direction by the adjustment mechanism of the embodiment.

FIG. 11 is a front view illustrating a case where the first adjustment portion 60a is adjusted and the second member 40 is moved to a side upper than that in the state illustrated in FIG. 7. FIG. 12 is a front view illustrating a case where the second adjustment portion 60b is adjusted and, the third member 50 is rotated around the rotation center axis J1 with respect to the state illustrated in FIG. 7. The two-dot chain lines in FIG. 11 and FIG. 12 indicate positions of respective members in the state illustrated in FIG. 7. The light axis AX indicated by leading lines of two-dot chain lines indicates the light axis AX of the field lens 90B in state illustrated in FIG. 7.

First, description will be made on an adjustment method of the light axis AX using the first adjustment portion 60a. In a state where the fixing screw 67 is loosened, an adjusting tool is inserted from the first adjusting hole 71a illustrated in FIG. 2 into the casing 3 and the first screw member 61 of the first adjustment portion 60a is rotated. The adjusting tool in the embodiment is, for example, a hexagonal wrench. The hexagonal wrench is inserted into the head portion hole of the first head portion 61a so as to turn the first screw member 61. With this, the first screw member 61 is advanced to and retreated from the first screw hole 47c in the longitudinal direction (Z-axis direction) to thereby make it possible to change the relative position between the first member 30 and the second member 40 in the longitudinal direction.

For example, with reference to FIG. 11, a case where the first screw member 61 is moved downward relatively to the first screw hole 47c is considered. The first head portion 61a of the first screw member 61 is in contact with the first extension unit 32 of the first member 30 fixed to the casing 3 from above and thus movement of the first screw member 61 to the lower side is regulated. Accordingly, the position of the first screw member 61 in the longitudinal direction (Z-axis direction) is not changed and the position of the second member 40 in the longitudinal direction is changed. With this, the first screw member 61 is rotated to be moved downward relatively with respect to the first screw hole 47c so as to make it possible to, as illustrated in FIG. 11, move the second member 40 upward.

The third member 50 is attached to the second member 40 through the rotation shaft portion 42a and thus the second member 40 is moved upward such that the third member 50 is also moved upward. Accordingly, the field lens 90B held in the third member 50 is moved upward. With this, the first screw member 61 is rotated in a predetermined direction so as to make it possible to move the position of the light axis AX of the field lens 90B upward.

On the other hand, when the position of the light axis AX of the field lens 90B is moved downward, the rotation direction of the first screw member 61 may be a direction reverse to a direction in which the position of the light axis AX is moved upward. In this case, although the first screw member 61 is moved upward relatively with respect to the first screw hole 47c, the longitudinal direction (Z-axis direction) corresponds to the vertical direction and thus, the second member 40 is moved downward due to its own weight. With this, the position of the first screw member 61 in the longitudinal direction is not changed and the second member 40 is moved downward. As a result, it is possible to move the position of the light axis AX of the field lens 90B downward.

In the embodiment, a force is applied to the first extension unit 32 of the first member 30 and the second extension unit 43 of the second member 40 by the first spring 63, in a direction to separate the first extension unit 32 and the second extension unit 43 from each other, in the longitudinal direction. For that reason, even when the longitudinal direction (Z-axis direction) is the direction other than the vertical direction, the position of the first screw member 61 in the longitudinal direction is not changed and the second member 40 is moved with respect to the first member 30. Accordingly, it is possible to adjust the position of the light axis AX in the longitudinal direction to any direction even when a posture of the adjustment mechanism 20 is in any posture.

As described above, it is possible to move the second member 40 in the longitudinal direction (Z-axis direction) with respect to the first member 30 by the first adjustment portion 60a. As a result, it is possible to adjust the position of the light axis AX of the field lens 90B in the longitudinal direction.

Next, description will be made on an adjustment method of the light axis AX using the second adjustment portion 60b. In a state where the fixing screw 67 is loosened, an adjusting tool is inserted from the second adjusting hole 71b illustrated in FIG. 2 into the casing 3 and the second screw member 62 of the second adjustment portion 60b is rotated. The adjusting tool in the embodiment is, for example, a hexagonal wrench. The hexagonal wrench is inserted into the head portion hole of the second head portion 62a so as to turn the second screw member 62. With this, the second screw member 62 is advanced to and retreated from the second screw hole 45a in the longitudinal direction (Z-axis direction).

For example, with reference to FIG. 12, a case where the second screw member 62 is moved downward relatively to the second screw hole 45a is considered. In this case, the third extension unit 52 of the third member 50 is pushed downward by the second head portion 62a. Here, the second screw hole 45a and the second through hole 52a are located at a position different from the rotation center axis J1 in the lateral direction (Y-axis direction) and thus when the third extension unit 52 is pushed downward by the second head portion 62a, rotational moment around the rotation center axis J1 is exerted to the third member 50. In this case, rotational moment in the counter-clockwise direction is applied in the third member 50 around the rotation center axis J1 in a front view. Accordingly, as illustrated in FIG. 12, it is possible to rotate the third member 50 around the rotation center axis J1 with respect to the second member 40 in the counter-clockwise direction in a front view. With this, it is possible to rotate the field lens 90B held in the third member 50 with respect to the second member 40.

Here, the rotation center axis J1 is deviated from the light axis AX in the longitudinal direction and thus, when the field lens 90B rotates around the rotation center axis J1, both the positions of the light axis AX of the field lens 90B in the lateral direction (Y-axis direction) and in the longitudinal direction (Z-axis direction) are changed. In a case illustrated in FIG. 12, the field lens 90B rotates counter-clockwise around the rotation center axis J1 in a front view such that the light axis AX is moved to the upper side and the right side (+Y side). With this, the second screw member 62 rotates in a predetermined direction to thereby make it possible for the light axis AX of the field lens 90B to move to the right side. In a case in which the state is changed from a state illustrated in FIG. 7 to a state illustrated in FIG. 12, a movement amount of the light axis AX to the upper side is sufficiently smaller than that of the light axis AX to the right side. That is, when an amount of rotation of field lens 90B around the rotation center axis J1 is sufficiently small, the movement amount of the light axis AX to the upper side by the rotation of field lens 90B is also sufficiently small, and it is possible to move the field lens 90B in the lateral direction (Y-axis direction) of the light axis AX by the rotation of field lens 90B around the rotation center axis J1.

In this case, in the second member 40, rotational moment, of which the direction is reverse to the rotational moment exerted to the third member 50, is exerted around the rotation center axis J1 as reaction. However, in the embodiment, the second member 40 is engaged with the first member 30 through the engagement units 42b and 42c and the guide holes 31b and 31c and movement of the second member 40 in the lateral direction (Y-axis direction) with respect to the first member 30 is regulated. For that reason, even when the second screw member 62 is turned, the second member 40 does not rotate with respect to the first member 30 and the position of the second member 40 is not changed.

On the other hand, when the position of the light axis AX of the field lens 90B is moved to the left side (−Y side), a direction along which the first screw member 61 is to be rotated needs only to be a reverse direction to a direction in which the position of the light axis AX is moved to the right side (+Y side). In this case, the second screw member 62 is moved upward relatively to the second screw hole 45a. In this case, in a state of being rotated as illustrated in FIG. 12, clockwise rotational moment around the rotation center axis J1 is exerted to the third member 50 in a front view due to its own weight. For that reason, the third member 50 is rotated clockwise around the rotation center axis J1 in a front view as the second head portion 62a of the second screw member 62 is moved to the upper side. With this, it is possible to move the light axis AX of the field lens 90B to the left side. In the example in which the state is changed from the state of FIG. 12 to the state of FIG. 7, the light axis AX of the field lens 90B is moved to the left side and also to the lower side. In this case, the movement amount of the light axis AX to the lower side is sufficiently smaller than the movement amount of the light axis AX to the left side.

In the embodiment, a force is applied to a direction to separate the third extension unit 52 of the third member 50 and the second extension unit 43 of the second member 40 from each other in the longitudinal direction by the second spring 64. For that reason, even when the third member 50 is not rotated due to its own weight by the posture of the adjustment mechanism 20, the second head portion 62a of the second screw member 62 is moved to the upper side, the third extension unit 52 is pushed to the upper side by the second spring 64, and the third member 50 is rotated clockwise around the rotation center axis J1 in a front view. Accordingly, it is possible to adjust the position of the light axis AX in the lateral direction (Y-axis direction) to any direction even when a posture of the adjustment mechanism 20 is in any posture.

As described above, it is possible to rotate the third member 50 around the rotation center axis J1 with respect to the second member 40 by the second adjustment portion 60b. As a result, it is possible to adjust the position of the light axis AX of the field lens 90B in the lateral direction (Y-axis direction).

It is possible to adjust the position of the light axis AX of the field lens 90B by combining the adjustment by the first adjustment portion 60a with the adjustment by the second adjustment portion 60b that is described above. In the adjustment of the position of the light axis AX of the field lens 90B, it is preferable that the position of the light axis AX in the lateral direction (Y-axis direction) is adjusted by the second adjustment portion 60b and then the position of the light axis AX in the longitudinal direction (Z-axis direction) is adjusted by the first adjustment portion 60a. This is because when the light axis AX is moved by the second adjustment portion 60b, the light axis AX may be moved in the lateral direction and the longitudinal direction.

By doing as described above, after the position of the light axis AX of the field lens 90B is adjusted, an adjusting tool is inserted into the casing 3 from the lens position fixing hole 71c illustrated in FIG. 2 and is turned to a direction in which the fixing screw 67 is fastened. In the embodiment, the adjusting tool is, for example, a hexagonal wrench. The fixing screw 67 is fastened to thereby the first member 30, the second member 40, and the third member 50 are fixed to each other and the position of the light axis AX of the field lens 90B is fixed.

It is possible to accurately make respective color light beams incident onto respective liquid crystal light modulation devices 400R, 400G, and 400B by performing such an adjusting work with respect to respective field lenses 90R, 90G, and 90B.

According to the embodiment, the first head portion 61a which is the operation portion of the first adjustment portion 60a and the second head portion 62a which is the operation portion of the second adjustment portion 60b are placed at the same side. For that reason, it is possible to perform the operation of the first adjustment portion 60a and the operation of the second adjustment portion 60b from the same side. With this, the position of the light axis AX of the field lens 90B is easily adjusted.

For example, when the advancement-and-retreatment movement of the second screw member 62 in the longitudinal direction is converted into the simple advancement-and-retreatment movement of the third member 50 (field lens 90B) in the lateral direction, a tool or a member for converting a movement direction between the second screw member 62 and the third member 50 needs to be provided. For that reason, the adjustment mechanism 20 becomes easy to be complicated due to an increase in the number of parts of the adjustment mechanism 20, or the like, which is problematic.

In contrast, according to the embodiment, movement of the light axis AX of the field lens 90B in the lateral direction is performed by rotating the third member 50 (field lens 90B) around the rotation center axis J1. For that reason, for example, the second screw member 62 is arranged at a position deviated with respect to the rotation center axis J1 in the lateral direction to thereby make it possible to easily convert the advancement-and-retreatment movement of the second screw member 62 in the longitudinal direction into rotational movement of the third member 50. As a result, it is possible to easily convert a portion of the advancement-and-retreatment movement of the second screw member 62 in the longitudinal direction into the advancement-and-retreatment movement of the third member 50 in the lateral direction. Accordingly, it is possible to prevent the adjustment mechanism 20 from being complicated.

As described above, according to the embodiment, it is possible to perform the positional adjustments of the light axis AX of the field lens 90B in the longitudinal direction and the lateral direction from the same side and also prevent the adjustment mechanism 20 from being complicated. Accordingly, it is possible to obtain the projector 1 having a structure with which time and efforts for adjusting the position of the light axis AX of the field lens 90B can be reduced while preventing the adjustment mechanism 20 from being complicated.

According to the embodiment, the fixing screw 67 is loosened to thereby make it possible to adjust the first adjustment portion 60a and the second adjustment portion 60b to adjust the position of the light axis AX of the field lens 90B. For that reason, even when deviation of the light axis AX occurs after the light axis AX of the field lens 90B is adjusted once, it is possible to readjust the position of the light axis AX of the field lens 90B. The adjustment mechanism 20 is built in the projector 1 and thus, exclusive adjustment equipment or the like is not needed. For that reason, it is possible to reduce time and efforts needed for readjustment of the light axis AX and rapidly perform readjustment of the light axis AX.

For example, a case where the second screw member is arranged along the lateral direction and the third member 50 is moved in the lateral direction similar to a way that the second member 40 is moved in the longitudinal direction by the first adjustment portion 60a is considered. In this case, the second head portion of the second screw member is provided at one side in the lateral direction with respect to the field lens 90B while the first head portion 61a of the first screw member 61 is provided above the field lens 90B. For that reason, the size of the adjustment mechanism 20 may be increased in any of the lateral direction and the longitudinal direction.

In contrast, according to the embodiment, the second head portion 62a of the second screw member 62 and the first head portion 61a of the first screw member 61 are provided at the same side (upper side in the embodiment) with respect to the field lens 90B. For that reason, it is possible to prevent the size of the adjustment mechanism 20 from being increased in at least one of the lateral direction and the longitudinal direction. With this, it is easy to miniaturize the adjustment mechanism 20 in its entirety.

According to the embodiment, in a state of FIG. 7, the position of the rotation center axis J1 in the lateral direction is the same as the position of the light axis AX of the field lens 90B in the lateral direction. For that reason, when the field lens 90B is rotated around the rotation center axis J1 from the state of FIG. 7, it is easy to make the movement amount of the light axis AX in the longitudinal direction sufficiently small within a range where a rotation angle is sufficiently small. With this, when the light axis AX is adjusted by the second adjustment portion 60b, it is possible to move the light axis AX in the lateral direction while preventing the light axis AX from being deviated in the longitudinal direction.

According to the embodiment, an optical member of which the light axis is adjusted by the adjustment mechanism 20 is the field lens 90B. For that reason, the light axis AX is adjusted by the adjustment mechanism 20 to hereby make it possible to adjust the direction of light emitted from the field lens 90B. With this, it is possible to guide light in the optical system of the projector 1 with high precision and improve use efficiency of light.

According to the embodiment, the first adjustment portion 60a includes the first screw member 61 extending in the longitudinal direction and the first screw member 61 is turned to thereby make it possible to move the second member 40 in longitudinal direction with respect to the first member 30. For that reason, it is possible to move the field lens 90B through the second member 40 and the third member 50 by a simple configuration. It is possible to adjust the movement amount of the second member 40 using an amount of turn of the first screw member 61, the position of the second member 40 in the longitudinal direction, that is, the position of the light axis AX of the field lens 90B in the longitudinal direction is easily and accurately adjusted.

For example, when the first through hole and the first screw hole are formed to be deviated in a plan view, the first screw member screwed into the first screw hole through the first through hole may be arranged obliquely with respect to the longitudinal direction. In this case, in the first screw member, a force may be applied from the inner edge of the first through hole and the inner edge of the first screw hole to the direction orthogonal to the longitudinal direction and relative advancement-and-retreatment movement of the first screw member with respect to the first screw hole may be disturbed. Especially, dimension of the first screw member which moves the field lens 90B in the longitudinal direction becomes easy to be increased and thus, a distance between the first through hole and the first screw hole in the longitudinal direction becomes easy to be increased and even when the first screw member is slightly inclined, moment, which is exerted to the first screw member, by the force received from the inner edge of each hole becomes easy to be increased. For that reason, the advancement-and-retreatment movement of the first screw member with respect to the first screw hole may be further disturbed easily.

In contrast, according to the embodiment, the first screw hole 47c is formed in the plate nut 47 held swingably with respect to the second member body. For that reason, for example, even when the first through hole 32a is formed at a deviated position, the plate nut 47 moves within a swingable range according to deviation of the first through hole 32a to thereby make it possible to align the position of the first through hole 32a and the position of the first screw hole 47c. Accordingly, it is possible to prevent the first screw member 61 from being obliquely arranged and prevent the advancement-and-retreatment movement of the first screw member 61 in the longitudinal direction from being disturbed. The particularly large effect may be obtained as the position at which the first through hole 32a is formed and the position at which the first screw hole 47c is formed are increasingly separated in the longitudinal direction. As described above, this is because when the first through hole 32a and the first screw hole 47c are formed to be deviated and thus the first screw member 61 is inclined as the position at which the first through hole 32a is formed and the position at which the first screw hole 47c is formed are separated in the longitudinal direction, moment exerted to the first screw member 61 becomes easy to be increased.

According to the embodiment, the second adjustment portion 60b includes the second screw member 62 extending in the longitudinal direction and it is possible to rotate the third member 50 around the rotation center axis J1 with respect to the second member 40 by turning the second screw member 62. For that reason, it is possible to move the field lens 90B through the third member 50 by a simple configuration. Since it is possible to adjust a rotational movement amount of the third member 50 using an amount of turn of the second screw member 62, it is easy to accurately adjust a rotation position of the third member 50, that is, the position of the light axis AX of the field lens 90B in the lateral direction with high precision.

For example, when the second screw hole is formed in the third member, the third member is rotated around the rotation center axis J1 and the second screw hole is also rotated around the rotation center axis J1. For that reason, the second screw member screwed into the second screw hole is also rotated around the rotation center axis J1 to change a facing direction of the second head portion which is the operation portion of the second adjustment portion. With this, the facing direction of the second head portion is changed while the position of the field lens 90B in the lateral direction is adjusted by the second adjustment portion and the adjustment by the second adjustment portion becomes difficult, which is problematic.

In contrast, according to the embodiment, the second screw hole 45a is formed in the second member 40. For that reason, even when the third member 50 is rotated with respect to the second member 40, the second screw hole 45a is not rotated and the facing direction of the second head portion 62a is not changed. With this, it is possible to prevent the adjustment by the second adjustment portion 60b from becoming difficult.

According to the embodiment, the first head portion 61a which is the operation portion of the first adjustment portion 60a and the second head portion 62a which is the operation portion of the second adjustment portion 60b are placed at a side opposite to the bottom portion 4a of the casing 3. For that reason, in a state where the adjustment mechanism 20 is installed at the field lens installation unit 72B of the casing body 3a, it is easy to perform the operation of the first adjustment portion 60a and the operation of the second adjustment portion 60b.

According to the embodiment, the field lens installation unit 72B includes the clamping units 73 that clamp and hold the first member 30, the second member 40, and the third member 50 in the light axis direction. For that reason, in the state where the adjustment mechanism 20 is installed at the field lens installation unit 72B, it is possible to prevent the second member 40 and the third member 50 from being moved in the light axis direction with respect to the first member 30 fixed to the casing body 3a. With this, the engagement units 42b and 42c of the second member 40 are prevented from coming off from the guide holes 31b and 31c of the first member 30 and the fitting hole 57a of the third member 50 is prevented from coming off from the rotation shaft portion 42a of the second member 40. Accordingly, it is possible to prevent connection between respective members from being coming off while achieving the relative movement between respective members.

According to the embodiment, the pressing unit 35 of the first member 30 is positioned at the more front side than the second frame unit 41 of the second member 40 arranged at the front side of the first frame unit 31 of the first member 30 and the third frame unit 51 of the third member 50 and overlaps the second frame unit 41 and the third frame unit 51 in a front view. For that reason, it is possible to regulate the movement of the second member 40 and the third member 50 to the front side with respect to the first member 30 by the pressing unit 35. With this, coming-off of the engagement units 42b and 42c of the second member 40 from the guide holes 31b and 31c of the first member 30 and coming-off of the fitting hole 57a of the third member 50 from the rotation shaft portion 42a of the second member 40 are further prevented. Accordingly, it is possible to prevent connection between respective members from being coming off while achieving the relative movement between respective members.

As such, according to the embodiment, it is possible to prevent connection between respective members of the adjustment mechanism 20 from being coming off in the upper portion of the adjustment mechanism 20 by the pressing unit 35 and prevent connection between respective members of the adjustment mechanism 20 from being coming off in the lower portion of the adjustment mechanism 20 by the clamping units 73. Accordingly, it is possible to stably maintain connection between respective members in both the upper portion and lower portion of the adjustment mechanism 20 and it is easy to more stably perform the adjusting work of the light axis AX of the field lens 90B by the adjustment mechanism 20.

According to the embodiment, the first adjusting hole 71a and the second adjusting hole 71b are formed in the lid portion 3b of the casing 3 and the operation portions of the respective adjustment portions, that is, the first head portion 61a and the second head portion 62a, are able to be viewed through respective adjusting holes. For that reason, it is possible to adjust the light axis AX of the field lens 90B without detaching the lid portion 3b in a state where the adjustment mechanism. 20 is accommodated in the casing 3. With this, it is possible to reduce time and efforts for readjusting the position of the light axis AX.

According to the embodiment, the lid portion 3b is not in contact with the adjustment mechanism 20. For that reason, the movement of respective members of the adjustment mechanism 20 is not disturbed by the lid portion 3b. With this, it is more easy to perform the adjustment of the light axis AX by the adjustment mechanism 20 in a state where the lid portion 3b is attached to the casing body 3a.

For example, in assembling the adjustment mechanism 20, the first screw member 61 is inserted into the first through hole 32a from above, passes through the first spring 63 and the insertion hole 45b, and is screwed into the first screw hole 47c after the first spring 63 is installed between the first extension unit 32 and the second extension portion body 45. Here, according to the embodiment, the end portion of the lower side of the first spring 63 is accommodated in the concave portion 45d. For that reason, it is possible to prevent the position of the end portion of the lower side of the first spring 63 from being deviated. With this, when the first screw member 61 is inserted, it is possible to prevent the position of the first spring 63 from being deviated. Similarly, the end portion of the lower side of the second spring 64 is accommodated in the concave portion 45d and thus, when the second screw member 62 is inserted, it is possible to prevent the position of the second spring 64 from being deviated. Accordingly, according to the embodiment, it is easy to assemble the adjustment mechanism 20.

According to the embodiment, the ribs 54c and 54d are provided. For that reason, even when the field lens 90B is moved in the lateral direction or the longitudinal direction with respect to the third member 50 due to application of an impact to the projector 1 or the like, the field lens 90B is in contact with the ribs 54c and 54d to thereby prevent the position of the field lens 90B with respect to the third member 50 from being largely deviated. With this, it is possible to prevent the plate spring unit 53c of the pressing member 53, which is in contact with the field lens 90B and is applying a force to the field lens 90B, from being largely deformed by the movement of the field lens 90B. Accordingly, it is possible to prevent the plate spring unit 53c from being broken by being subjected to plastic deformation.

According to the embodiment, the pressing member 53 includes the locking unit 53b. For that reason, when the corner portion of the pressing member 53 side of the field lens 90B is moved to the front side due to application of an impact to the projector 1 or the like, the locking unit 53b is in contact with the field lens 90B and the movement of the field lens 90B is regulated. With this, it is possible to prevent the field lens 90B from coming off from the third member 50.

In the embodiment, it is possible to adopt the following configuration.

In the above-description, although the field lenses 90R, 90G, and 90B are used as optical members, the optical members are not limited thereto and may also be, for example, a lens such as a relay lens or the like other than the field lens. The optical member is not limited to the lens but may include other optical members.

In the above-description, a configuration in which the first through hole 32a is formed in the first member 30 and the first screw hole 47c is formed in the second member 40 is adopted but is not limited thereto. In the embodiment, the first screw hole 47c may be formed in one of the first member 30 and the second member 40 and the first through hole 32a may be formed in the other of the first member 30 and the second member 40. That is, the first through hole 32a may also be formed in the second member 40 and the first screw hole 47c may also be formed in the first member 30. The first screw hole 47c may also be directly formed in the second extension portion body 45.

In the above-description, a configuration in which the second through hole 52a is formed in the third member 50 and the second screw hole 45a is formed in the second member 40 is adopted but is not limited thereto. In the embodiment, the second screw hole 45a may be formed in one of the second member 40 and the third member 50 and the second through hole 52a may be formed in the other of the second member 40 and the third member 50. That is, the second through hole 52a may also be formed in the second member 40 and the second screw hole 45a may also be formed in the third member 50.

The facing directions of the operation portion (first head portion 61a) of the first adjustment portion 60a and the operation portion (second head portion 62a) of the second adjustment portion 60b are not particularly limited as long as the operation portions are located at the same side to each other. For example, respective operation portions may also be placed at one side in the direction oblique with respect to the longitudinal direction and the portions may also be placed at one side in the lateral direction.

The configuration of the first adjustment portion 60a and the configuration of the second adjustment portion 60b are not limited to a configuration in which a screw member is used. The first adjustment portion 60a may not include the first spring 63. The second adjustment portion 60b may not include the second spring 64.

The adjusting hole formed in the lid portion 3b of the casing 3 may be only the single adjusting hole. In this case, a configuration in which both the first head portion 61a and the second head portion 62a are capable of being viewed from the single adjusting hole may be made. The adjusting hole may not be formed in the lid portion 3b of the casing 3. In this case, the operation of the adjustment mechanism 20 is performed in a state where the lid portion 3b is come off.

In the respective embodiments described above, although description is made on an example in which the invention is applied to the transmission type projector, the invention may also be applied to a reflection type projector. Here, the "transmission type" means a type that works for transmitting light by a liquid crystal light modulation device including a liquid crystal panel or the like.

The "reflection type" means a type that works for reflecting light by the liquid crystal light modulation device.

In the respective embodiments described above, although the projector 1 including three liquid crystal light modulation devices 400R, 400G, and 400B is exemplarily illustrated, it is also possible to apply a projector displaying a color image by a single liquid crystal light modulation device and a projector displaying a color image by four or more liquid crystal light modulation devices. A digital mirror device (DMD) may also be used as the light modulation device.

Respective configurations described above may be suitably combined in a range without mutual contradiction.

The present application claim priority from Japanese Patent Application No. 2016-020193 filed on Feb. 4, 2016, which is hereby incorporated by reference in its entirety.

What is claimed is:

1. A projector, comprising:
   a light source emitting light;
   an optical member onto which light emitted from the light source is incident;
   a light modulation device modulating light passing through the optical member;
   a projection optical device projecting light modulated by the light modulation device; and
   an adjustment mechanism adjusting a light axis of the optical member,
   wherein the adjustment mechanism includes
      a first member,
      a second member attached to be movable in a first direction orthogonal to the light axis of the optical member with respect to the first member,
      a third member holding the optical member and attached to be rotatable around a rotation center axis parallel to the light axis with respect to the second member,
      a first adjustment portion moving the second member in the first direction with respect to the first member, and
      a second adjustment portion rotating the third member around the rotation center axis with respect to the second member, and
   an operation portion of the first adjustment portion and an operation portion of the second adjustment portion are placed at the same side.

2. The projector according to claim 1,
   wherein the optical member is a lens.

3. The projector according to claim 1,
   wherein the first adjustment portion includes a first screw member of which a head portion is the operation portion of the first adjustment portion,
   a first screw hole is formed in one of the first member and the second member,
   a first through hole is formed at a side closer to the head portion of the first screw member than the first screw hole in the other of the first member and the second member, and the first screw member extends in the first direction, penetrates into the first through hole, and is screwed into the first screw hole.

4. The projector according to claim 3,
wherein the first through hole is formed in the first member,
the first screw hole is formed in the second member,
the second member includes
a second member body, and
a swinging member held swingably with respect to the second member body, and
the first screw hole is formed in the swinging member.

5. The projector according to claim 1,
wherein the second adjustment portion includes a second screw member of which a head portion is the operation portion of the second adjustment portion,
a second screw hole is formed in one of the second member and the third member,
a second through hole is formed at a side closer to the head portion of the second screw member than the second screw hole in the other of the second member and the third member,
the second screw hole and the second through hole are located at positions different from the rotation center axis in a second direction orthogonal to both the light axis and the first direction, and
the second screw member extends in the first direction, penetrates into the second through hole, and is screwed into the second screw hole.

6. The projector according to claim 5,
wherein the second screw hole is formed in the second member, and
the second through hole is formed in the third member.

7. The projector according to claim 1, further comprising:
a casing accommodating the optical member and the adjustment mechanism,
wherein the casing includes a casing body which includes an installation portion in which the optical member is provided through the adjustment mechanism,
the casing body includes
a bottom portion, and
a wall raised from an outer edge of the bottom portion, and
the operation portion of the first adjustment portion and the operation portion of the second adjustment portion are placed at the side opposite to the bottom portion.

8. The projector according to claim 7,
wherein the first member, the second member, and the third member are arranged to be overlapped when viewed along a third direction parallel to the light axis, and
the installation portion includes clamping units clamping and holding the first member, the second member, and the third member in the third direction.

9. The projector according to claim 7,
wherein the casing further includes a lid portion covering the bottom portion attached to an end portion located at the side opposite to another bottom portion of the wall,
an adjusting hole penetrating through the lid portion is formed in the lid portion, and
the operation portion of the first adjustment portion and the operation portion of the second adjustment portion are capable of being viewed from outside of the casing through the adjusting hole.

10. The projector according to claim 7,
wherein the casing further includes a lid portion covering the bottom portion attached to an end portion located at the side opposite to another bottom portion of the wall, and
the lid portion is not in contact with the adjustment mechanism.

* * * * *